(12) United States Patent
Kaneko et al.

(10) Patent No.: US 8,280,614 B2
(45) Date of Patent: Oct. 2, 2012

(54) DEVICE FOR CONTROLLING QUANTITY OF INJECTED FUEL

(75) Inventors: Masayuki Kaneko, Kariya (JP); Hironari Nakagawa, Nagoya (JP); Shigeo Tojo, Kariya (JP); Mitsuhiro Yabe, Aichi-ken (JP)

(73) Assignee: Denso Corporation, Kariya (JP)

( * ) Notice: Subject to any disclaimer, the term of this patent is extended or adjusted under 35 U.S.C. 154(b) by 149 days.

(21) Appl. No.: 12/835,087

(22) Filed: Jul. 13, 2010

(65) Prior Publication Data
US 2011/0010077 A1   Jan. 13, 2011

(30) Foreign Application Priority Data
Jul. 13, 2009   (JP) .................................. 2009-164719

(51) Int. Cl.
*F02D 41/26* (2006.01)
(52) U.S. Cl. ........ 701/105; 701/107; 123/478; 123/479; 123/480
(58) Field of Classification Search .......... 701/103–107; 123/472, 479, 480, 482, 478
See application file for complete search history.

(56) References Cited

U.S. PATENT DOCUMENTS
5,908,022 A * 6/1999 Aoki et al. ............... 123/568.16

FOREIGN PATENT DOCUMENTS

| JP | 2002-303193 | 10/2002 |
|---|---|---|
| JP | 2005-248721 | 9/2005 |
| JP | 2007-023952 | 2/2007 |
| JP | 2007-85250 | 4/2007 |
| JP | 2011-21489 | * 2/2011 |
| WO | WO 02/081891 | 10/2002 |

OTHER PUBLICATIONS

Japanese Office Action dated Aug. 23, 2011, issued in corresponding Japanese Application No. 2009-164719 with English Translation.

* cited by examiner

*Primary Examiner* — Hai Huynh
(74) *Attorney, Agent, or Firm* — Nixon & Vanderhye P.C.

(57) ABSTRACT

A control device has a CPU for determining an opening time and a conversion time, set in a non-injection period between preceding and present injections, in an interception process every fuel injection, and a control circuit for controlling a converting unit, independent of the operation of the CPU, to convert an analog signal, indicating fuel pressure of an injector, into a converted value at the conversion time. The CPU determines a closing time from the opening time and the converted value in another interception process. The device has a driving circuit for starting the valve opening at the opening time to open the injector and to inject fuel from the opened injector into an engine and starting the valve closing at the closing time to close the injector and to stop the fuel injection when the injected fuel reaches a required quantity.

17 Claims, 10 Drawing Sheets

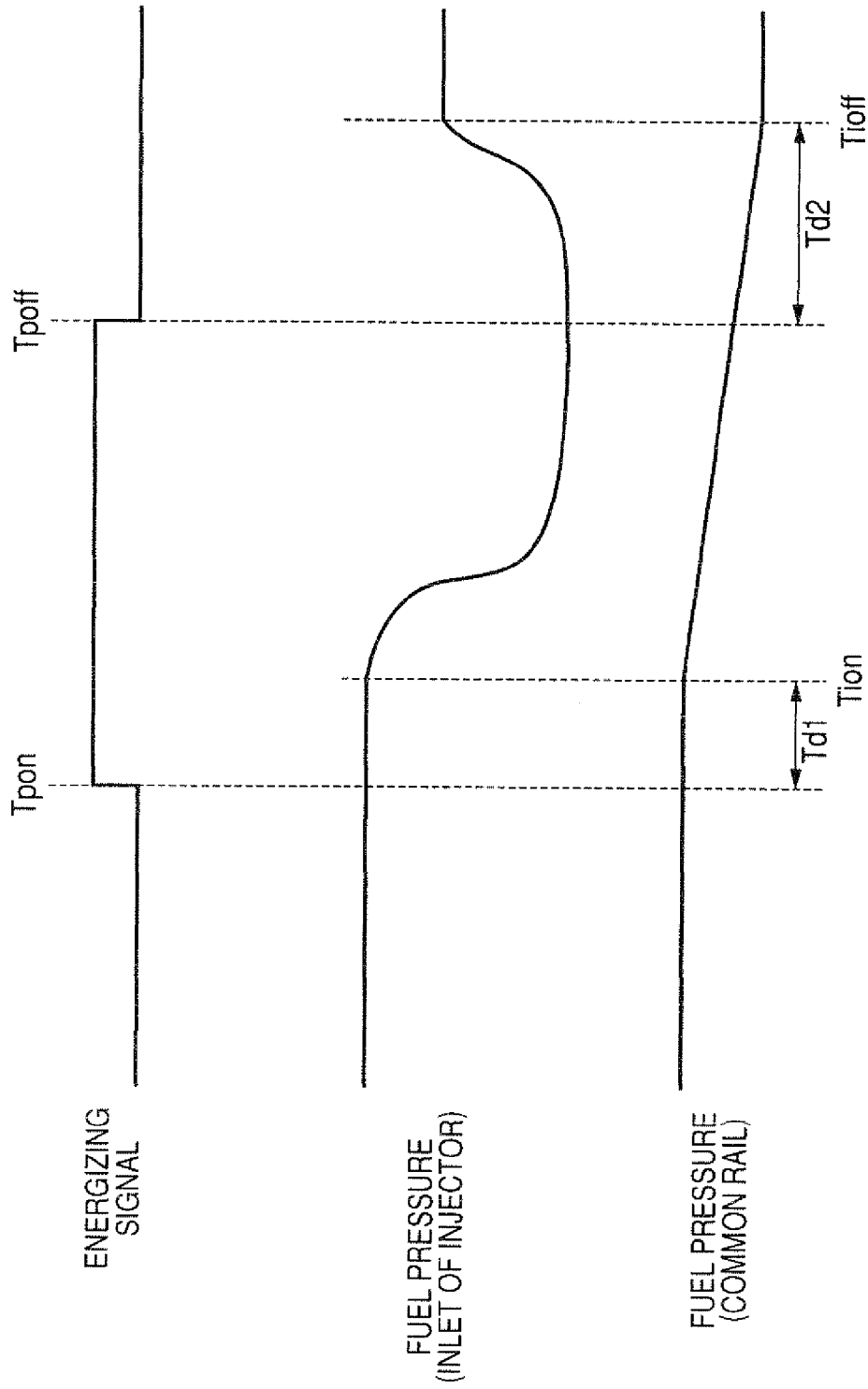

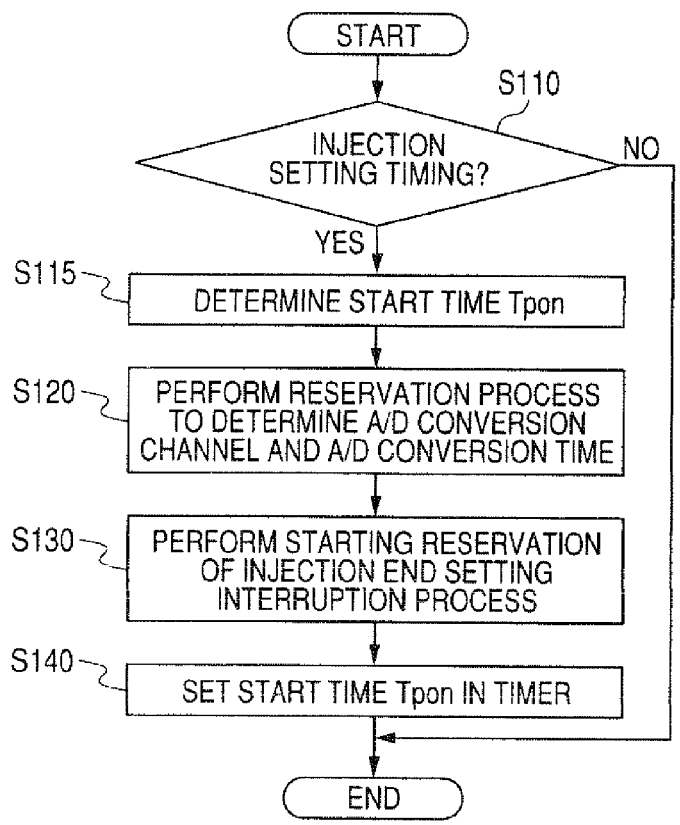
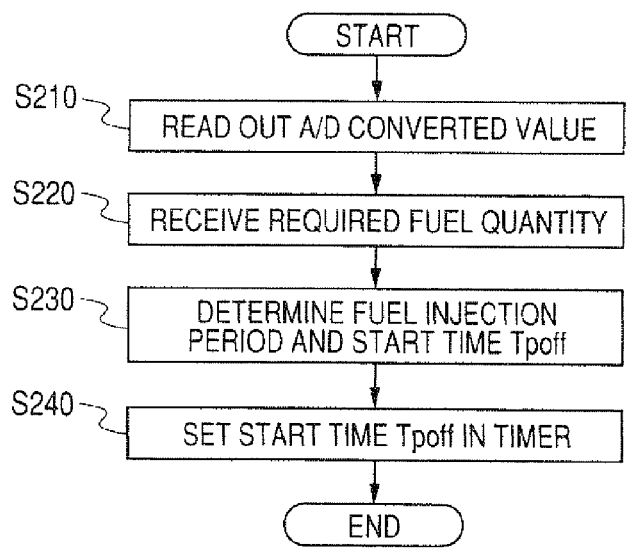

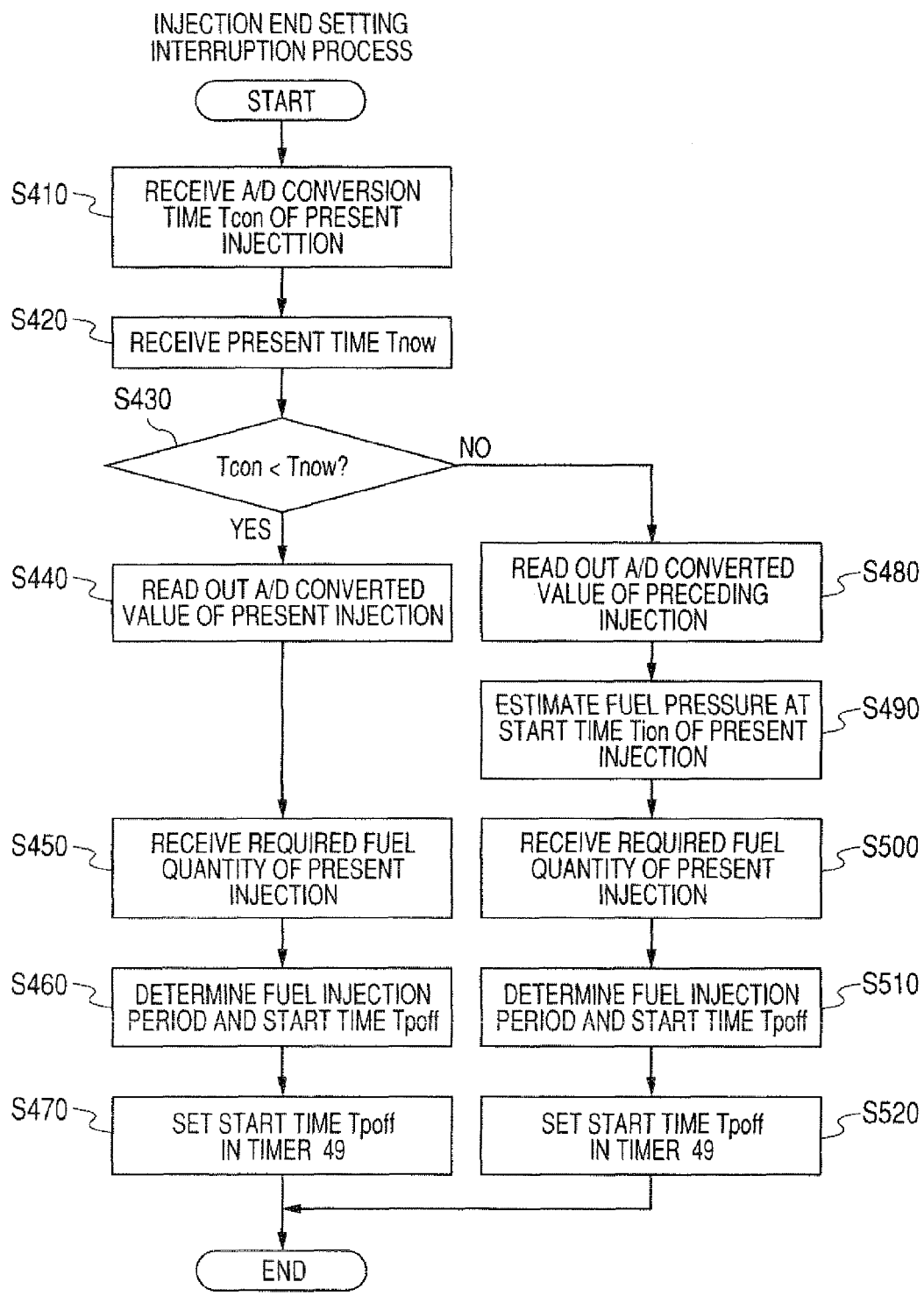

DEVICE FOR CONTROLLING QUANTITY OF INJECTED FUEL

CROSS-REFERENCE TO RELATED APPLICATION

This application is based upon and claims the benefit of priority of the prior Japanese Patent Application 2009-154715 filed on Jul. 13, 2009, so that the contents of which are incorporated herein by reference.

BACKGROUND OF THE INVENTION

1. Field of the Invention

The present invention relates to a fuel injection control device which controls a quantity of the fuel injected from a fuel injection valve into an internal combustion engine by adjusting an opening period of the fuel injection valve.

2. Description of Related Art

A fuel injection control device is mounted on a vehicle to control the injected fuel, actually injected from a fuel injection valve into an internal combustion engine, at a required quantity determined based on operating states of the engine. To control the injected fuel at the required quantity, it is required to determine a fuel injection period of time (i.e., an opening period of the valve). However, an actual quantity of the injected fuel is changed with a pressure of fuel pumped up and sent to the valve. Therefore, it is required to detect the fuel pressure before the start time of the fuel injection and to determine the fuel injection period of time from the detected fuel pressure. Further, the fuel pressure is changed with time. Especially, after the fuel injection is started, the fuel pressure is considerably dropped. Therefore, it is desired to determine the fuel injection period from the fuel pressure detected just before the start time of the fuel injection.

Published Japanese Patent First Publication No. 2005-248721 discloses a fuel injection controller for determining a fuel injection period from a fuel pressure according to a first technique. In this technique, when the rotation of a crankshaft of the engine is started, a central processing unit (CPU) of a fuel injection control device performs an interrupt ion process to judge, based on a crank angle of the crankshaft, whether or not it is a timing to start a fuel injection. When it is now a fuel injection start timing, the CPU controls an analog-to-digital (A/D) converter to convert an analog fuel pressure signal, sent from a fuel pressure sensor, into a converted digital value (i.e., a detected fuel pressure value). Then, the CPU calculates a fuel injection period of time by using the converted digital value and a required quantity of the injected fuel, and the CPU determines both an on-timing and an off-timing of an injection pulse from the calculated fuel injection period and sets the on-timing and the off-timing in an injection pulse output timer.

The timer generates this injection pulse having a level change at cachet the on-timing and the off-timing, and a fuel injection valve is driven in response to the injection pulse. Therefore, the injection pulse acts as a driving signal. The injection pulse is also called an energizing pulse. When the on-timing set in the timer comes, the injection pulse set at an active level is sent from the timer to a driving circuit, and the driving circuit opens the fuel injection valve. In contrast, when the off-timing set in the timer comes, the injection pulse set at a non-active level is sent to the driving circuit, and the driving circuit closes the fuel injection valve.

Each of Published Japanese Patent First Publication No. 2002-303193 and the Publication No. 2005-248721 discloses a fuel injection controller for determining a fuel injection period from a fuel pressure according to a second technique.

In this technique, when the on-timing of the injection pulse comes, the driving circuit starts the valve opening of the fuel injection valve, and the CPU starts the interruption process to control the A/D converter. Under this control, the A/D converter receives an analog fuel pressure signal from a fuel pressure sensor and converts the signal into a converted digital value. Then, the CPU calculates a fuel injection period of time by using the converted digital value and a required quantity of the injected fuel, and the CPU sets a time, elapsed from the on-timing by the calculated fuel injection period, in the timer as an off-timing of the injection pulse. The fuel injection valve is actually opened by the driving circuit at a time delayed from the on-timing of the injection pulse by a valve delay time.

However, in the first technique, to calculate the fuel injection period by using the fuel pressure, it is required to convert the analog signal indicating the fuel pressure into the converted digital value. Therefore, a fuel pressure required for the calculation of the fuel injection period is detected at a timing which is earlier than the on-timing of the injection pulse by plenty of time. This detected fuel pressure is sometimes considerably different from a fuel pressure at a timing just before the on-timing of the injection pulse.

Particularly, in case of a so-called multistage injection, a plurality of fuel injections are serially performed to repeatedly inject fuel from one fuel injection valve to the corresponding cylinder of the engine during one rotational movement of the cylinder. Therefore, at least one fuel injection is performed in a short fuel injection period. In this case, there is a high probability that an execution period of time required of the interruption process to set the on-timing and the off-timing in the timer for the present fuel injection overlaps with a fuel injection period of the preceding fuel injection. In this case, as a fuel pressure required for the calculation of a fuel injection period of the present fuel injection, a fuel pressure in the preceding fuel injection is sometimes detected. Therefore, in the first technique, the precision in the control of the fuel injection quantity is lowered.

Further, in the second technique, to calculate the fuel injection period by using the fuel pressure, the conversion of the analog fuel pressure signal into the converted digital value is performed in response to the on-timing of the injection pulse. Therefore, there is a probability that the fuel injection period is calculated by using a fuel pressure detected just before the start of the fuel injection. However, although the fuel injection period should be calculated based on a fuel pressure detected just before the start of the fuel injection, there is also another probability that the fuel injection period is calculated by using a fuel pressure detected just after the start of the fuel injection. The fuel pressure detected just after the start of the fuel injection is considerably lower than the fuel pressure detected just before the start of the fuel injection.

More specifically, the CPU performs various processes in order of priority. Therefore, even when the CPU receives a request for starting the interruption process, the CPU sometimes performs another process, having a priority higher than a priority of the interruption process, in a period of time including the on-timing of the injection pulse. In this case, because the start of the interrupt ion process is delayed from the on-timing of the injection pulse, a period of time from the on-timing of the injection pulse to the completion of the A/D conversion of the fuel pressure signal sometimes becomes longer than the valve delay time from the on-timing of the injection pulse to the actual valve opening. This means that the converted digital value obtained in this conversion is undesirably determined from a fuel pressure detected just after the start of the fuel injection.

Therefore, in the second technique, the fuel injection control device controls the fuel injection quantity with insufficient precision.

SUMMARY OF THE INVENTION

An object of the present invention is to provide, with due consideration to the drawbacks of the conventional fuel injection controllers, a fuel injection control device which controls a quantity of the fuel, injected from a fuel injection valve into an engine, with high precision.

According to an aspect of this invention, the object is achieved by the provision of a fuel injection control device comprising a fuel pressure converting unit, a first control unit, a second control unit, and a driving unit to control a quantity of fuel injected from a fuel injection valve into an engine. The fuel pressure converting unit receives an analog fuel pressure signal, indicating a pressure of the fuel in the fuel injection valve, and performs an analog-to-digital conversion of the fuel pressure signal into an A/D converted value. The fuel pressure is changeable with time. The first control unit determines a valve opening operation start time and an analog-to-digital conversion time in a first process routine, which is started in synchronization with a specific rotational angle of a crankshaft rotated by a driving force of the engine, and determines a valve closing operation start time from the valve opening operation start time and the A/D converted value of the fuel pressure converting unit in a second process routine performed after the first process routine. The second control unit controls the fuel pressure converting unit to receive the fuel pressure signal at the analog-to-digital conversion time determined by the first control unit and to convert the fuel pressure signal into the A/D converted value at the analog-to-digital conversion time. The driving unit starts a valve opening operation at the valve opening operation start time determined by the first control unit to open the fuel injection valve and to inject the fuel into the engine through the opened fuel injection valve and starts a valve closing operation at the valve closing operation start time determined by the first control unit to close the fuel injection valve and to stop the injection of the fuel into the engine.

With this structure of the device, the first control unit determines the valve opening operation start time and the analog-to-digital conversion time in the first process routine every fuel injection from the valve to the engine. Thereafter, the fuel pressure converting unit converts the fuel pressure signal into the A/D converted value at the analog-to-digital conversion time. Thereafter, the first control unit determines the valve closing operation start time from the valve opening operation start time and the A/D converted value in the second process routine.

Therefore, the analog-to-digital conversion of the signal is not performed in either the first process routine nor the second process routine. That is, the analog-to-digital conversion under control of the second control unit is performed independent of the process routines performed in the first control unit.

Accordingly, the first control unit can arbitrarily set the analog-to-digital conversion time in a non-injection period of time between the preceding injection and the present injection.

In the actual operation of the valve, the valve opening is actually started at an actual start time later than the valve opening operation start time by a valve opening delay time, and the valve closing is actually ended at an actual end time later than the valve closing operation start time by a valve closing delay time. Therefore, the first control unit can arbitrarily set the analog-to-digital conversion time in the non-injection period from the actual end time of the preceding fuel injection to the actual start time of the present fuel injection. The actual start time of one fuel injection is determined by adding the valve opening delay time to the valve opening operation start time of the fuel injection. The actual end time of one fuel injection is determined by adding the valve closing delay time to the valve closing operation start time of the fuel injection.

In this case, even when the execution period of the first process routine overlaps with the period of the preceding fuel injection or even when the second process routine is started at a time later than the actual start time of the present fuel injection, the first control unit can determine the valve closing operation start time from the A/D converted value detected between the actual end time of the preceding fuel injection and the actual start time of the present fuel injection.

Accordingly, the device can prevent the valve closing operation start time from being determined from the fuel pressure detected during the fuel injection, and the device can control a quantity of the injected fuel with high precision.

Further, no analog-to-digital conversion of the signal is performed in the second process routine. Therefore, the execution period of the second process routine can be shortened. In this case, even when the period of one fuel injection is short so as to shorten a period of time from the start time of the second process routine to the valve closing operation start time, the first control unit can reliably determine the valve closing operation start time before the valve closing operation start time actually comes, and the driving unit can reliably start the valve closing operation when the valve closing operation start time has actually arrived.

BRIEF DESCRIPTION OF THE DRAWINGS

FIG. 2 is a time chart showing a change of a fuel pressure at the inlet of an injector and a change of a fuel pressure in a common rail in response to an energizing signal;

FIG. 3 is a flow chart showing an NE pulse interruption process according to the first embodiment;

FIG. 4 is a flow chart showing an injection end setting interruption process according to the first embodiment;

FIG. 11 is a flow chart showing the injection end setting interruption process according to the third embodiment.

DETAILED DESCRIPTION OF THE PREFERRED EMBODIMENTS

Embodiments of the present invention will now be described with reference to the accompanying drawings.

First Embodiment

Figure 1:
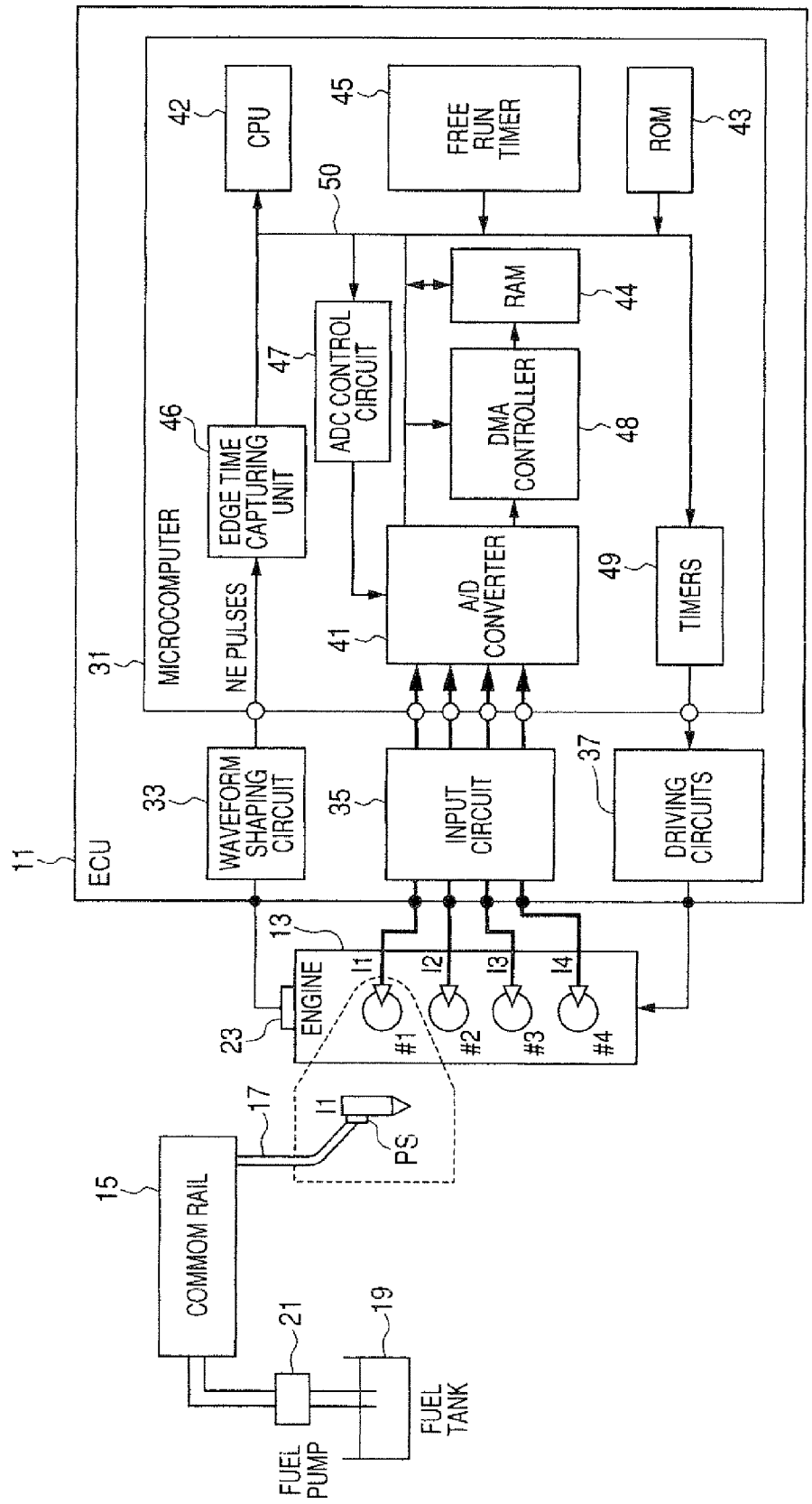
FIG. 1 is a block diagram of a fuel injection control device according to the first embodiment of the present invention.

FIG. 1 is a block diagram of a fuel injection control device according to the first embodiment. As shown in FIG. 1, four fuel injection valves (hereinafter called injectors) I1, I2, I3 and I4 are located on an on-board diesel engine 13 of a vehicle so as to inject fuel into four cylinders #1, #2, #3 and #4 of the engine 13, respectively. An electronic control unit (ECU) 11 representing a fuel injection control device controls each injector Ij (j=1, 2, 3 or 4) to inject fuel into the engine 13 by a required quantity. Each injector Ij is formed of an electromagnetic valve. When electric current is supplied to a coil of the injector Ij, the injector Ij is opened.

Fuel held in a fuel tank 19 of the vehicle is pumped up by a fuel pump 21 and is supplied to a common rail 15 acting as an accumulated pressure chamber of the fuel. The fuel pump 21 is formed of an engine-driven type of high-pressure pump. This pump 21 is driven by the rotational force of a crankshaft which is rotated by the driving force generated in the engine 13. Then, the fuel held in the common rail 15 is supplied to the injectors I1 to I4 through a fuel supply pipe 17.

A fuel pressure sensor PS corresponding to each injector Ij is located in the pipe 17 so as to detect the fuel pressure at the inlet of the injector Ij. Each fuel sensor PS always detects a pressure of the fuel, which is supplied to the corresponding injector Ij at the present time, and outputs an analog fuel pressure signal, indicating the fuel pressure detected at the present time, to the ECU 11. Therefore, the ECU 11 can receive the fuel pressure signal, indicating the fuel pressure at the present time, at any time. Further, various sensors such as a crank angle sensor 23, an intake air sensor, a water temperature sensor, an acceleration stroke sensor, an air-to-fuel sensor and the like (not shown) are located to detect operating states (e.g., a crank angle, a quantity of the intake air, a water temperature, an accelerator pedal stroke position, an air-to-fuel ratio and the like) of the engine 13. The ECU 11 receives the fuel pressure signals and analog signals indicating the operating states of the engine 13 from the sensors.

The ECU 11 has a microcomputer 31, a waveform shaping circuit 33, an input circuit 35 and a plurality of driving circuits 37 (i.e., a driving unit) corresponding to the respective injectors. A crank angle signal of the sensor 23 is shaped in the circuit 33 to serially have a plurality of pulses shaped in a rectangular waveform. In this shaped crank angle signal, a leading edge of one pulse is formed each time the crankshaft is rotated by a predetermined angle (e.g., 10 degrees). That is, the period of time between two leading edges of two adjacent pulses is equal to the period of time required to rotate the crankshaft by the predetermined angle. This pulse is called an NE pulse. The microcomputer 31 receives NE pulses of this shaped crank angle signal.

The input circuit 35 receives the fuel pressure signal of the fuel pressure sensor PS corresponding to each injector Ij and sends this signal to the microcomputer 31. Further, the input circuit 35 receives the analog signals indicating the operating states of the engine 13 and sends these signals to the microcomputer 31.

Each driving circuit 37 drives the corresponding injector Ij under control of the microcomputer 41 to start the valve opening operation for the injector Ij at a valve opening operation start time Tpon and to start the valve closing operation for the injector Ij at a valve closing operation start time Tpon.

The microcomputer 31 has a free run timer 45 for indicating a present time, an edge time capturing unit 46 for producing a request in synchronization with a leading edge of each NE pulse, and an analog-to-digital converter (ADC) (i.e., a fuel pressure converting unit) 41 for performing an analog-to-digital (A/D) conversion of the fuel pressure signal.

The capturing unit 46 receives the NE pulses from the circuit 33, captures and stores a present time indicated by the timer 45 as an edge occurring time in synchronization with the leading edge of each NE pulse, and generates an NE interruption request in synchronization with the leading edge of each NE pulse.

The A/D converter 41 has four input channels connected with the fuel pressure sensors PS of the respective injectors I1 to I4 through the input circuit 35. The A/D converter 41 receives the fuel pressure signal from the fuel pressure sensor PS corresponding to each injector Ij and performs the A/D conversion of the signal into an analog-to digital (A/D) converted value.

The microcomputer 31 further has a central processing unit (CPU) (i.e., a first control unit) 42 for performing an NE pulse interruption process (i.e., a first process routine) in response to the request of the unit 46 and performing an injection end setting interruption process (i.e., a second process routine) in response to another request, an analog-to-digital converter (ADC) control circuit 47 (i.e., a second control unit) for controlling the A/D converter 41 under control of the CPU 42, a random access memory (RAM) (i.e., a fuel pressure storing unit) 44 for storing data and values needed for the arithmetic operation of the CPU 42, storing calculated values obtained in the CPU 42 and storing the A/D converted values obtained in the ADC 41, a direct memory access (DMA) controller 48 for controlling the RAM 44 to store the A/D converted values, a read only memory (ROM) 43 for storing a computer program or computer programs to be executed in the CPU 42, and four timers 49 for generating energizing signals under control of the CPU 42 and outputting the energizing signals to the respective driving circuits 37.

The constitutional elements of the microcomputer 31 are connected with one another through a bus 50. The ADC control circuit 47 is operated independent of the operation of the CPU 42.

The microcomputer 31 is operated in a single-shot timer trigger A/D conversion mode or in a repeating timer trigger A/D conversion mode. In the single-shot timer trigger A/D conversion mode, the A/D conversion of one fuel pressure signal is performed only once every fuel injection. In contrast, in the repeating timer trigger A/D conversion mode, the A/D conversion of one fuel pressure signal is repeatedly performed every fuel injection.

The CPU 42 performs an NE pulse interruption process in response to each NE interruption request of the capturing unit 46. In this interruption process performed in the single-shot timer trigger A/D conversion mode, the CPU 42 determines an A/D conversion channel, an analog-to-digital (A/D) conversion time and a valve opening operation start time (hereinafter, called an opening start time) Tpon. The A/D conversion channel indicates one input channel of the A/D converter 41 through which the fuel pressure signal indicating the fuel pressure at the inlet of the injector Ix (x=1, 2, 3 or 4) corresponding to one cylinder #x is received in the A/D converter 41. That is, the A/D conversion channel indicates one injector Ix. The A/D conversion time denotes a time at which the A/D conversion of the fuel pressure signal corresponding to the injector Ix should be performed. The opening start time Tpon denotes a time at which the driving circuit 37 starts the valve opening operation for the corresponding injector Ix.

The CPU 42 sets the A/D conversion channel and the A/D conversion time in the ADC control circuit 47. More specifically, the ADC control circuit 47 receives information indicating the A/D conversion channel and information indicating the A/D conversion time from the CPU 42 and stores them.

The ADC control circuit 47 controls the A/D converter 41 to receive the fuel pressure signal, corresponding to the injector IX indicated by the A/D conversion channel, at the A/D conversion time and to perform the A/D conversion of the fuel pressure signal into an analog-to-digital (A/D) converted value at the A/D conversion time. More specifically, when the control circuit 47 detects that the A/D conversion time has actually arrived, the control circuit 47 immediately obtains an analog fuel pressure signal detected at the present time in the fuel sensor PS and controls the A/D converter 41 to convert the fuel pressure signal at the A/D conversion time. The ADC control circuit 47 has a comparator (not shown) for comparing the present time indicated by the timer 45 and the A/D conversion time set by the CPU 42, so that the circuit 47 can detect that the A/D conversion time has actually arrived.

Further, the control circuit 47 controls the DMA controller 48 to transfer the A/D converted value of the A/D converter 41 to the RAM 44. Therefore, the RAM 44 stores the A/D converted value corresponding to the A/D conversion channel.

In the NE pulse interruption process performed in the repeating timer trigger A/D conversion mode, the CPU 42 determines an A/D conversion start time Tst, an A/D conversion time interval Tad and an A/D conversion number Nad (Nad≧2) in addition to the conversion channel and the opening start time Tpon, and sets the conversion start time Tst, the time interval Tad, the conversion number Nad and the conversion channel in the ADC control circuit 47 before the start time Tst actually comes. More specifically, the circuit 47 receives information indicating the conversion start time Tst, the time interval Tad and the conversion number Nad from the CPU 42 in addition to the conversion channel and stores them.

The ADC control circuit 47 controls the A/D converter 41 to receive a plurality of fuel pressure signals, of which the number is equal to the A/D conversion number Nad, at the A/D conversion time intervals Tad, while starting the reception of the fuel pressure signals at the conversion start time Tst, and to perform the A/D conversion of one fuel pressure signal into an A/D converted value each time the fuel pressure signal is received. More specifically, when the control circuit 47 detects that the A/D conversion time has actually arrived, the control circuit 47 obtains a plurality of fuel pressure signals, each of which is detected at the present time, at the A/D conversion time intervals Tad and controls the A/D converter 41 to perform A/D conversions of the fuel pressure signals into A/D converted values at the A/D conversion time intervals Tad until the number of A/D converted values calculated in the A/D converter 41 reaches the A/D conversion number Nad.

Further, the control circuit 47 controls the DMA controller 48 to transfer the A/D converted values of the A/D converter 41 to the RAM 44. The control circuit 47 detects the present time of the timer 45 as a DMA transfer time (i.e., time information) each time the DMA controller 48 transfers one A/D converted value to the RAM 44. The control circuit 47 controls the RAM 44 to store this A/D converted value with the DMA transfer time such that the A/D converted value is associated with the DMA transfer time.

The RAM 44 has both an A/D converted value storing area and a DMA transfer time storing area. In the single-shot timer trigger A/D conversion mode, the A/D converted value is stored in a specific region of the A/D converted value storing area. Each time the RAM 44 receives a new A/D converted value of the present fuel injection, the A/D converted value of the preceding fuel injection stored in the specific region is renewed to the new A/D converted value. Therefore, the CPU 42 can read out the A/D converted value, obtained at the A/D conversion time determined for the present fuel injection, from the specific region of the RAM 44. In contrast, in the repeating timer trigger A/D conversion mode, the A/D converted values of the A/D converter 41 are, respectively, stored in regions of the A/D converted value storing area in the address increasing order starting from the top address, and the DMA transfer times are, respectively, stored in regions of the DMA transfer time storing area in the address increasing order starting from the top address. Therefore, each A/D converted value is associated with the corresponding DMA transfer time, so that the CPU 42 can read out each A/D converted value with the corresponding DMA transfer time. Further, each time the RAM 44 receives new A/D converted values of the present fuel injection, the A/D converted values of the preceding fuel injection stored in the storing area are renewed to the new A/D converted values. Therefore, the CPU 42 can read out the A/D converted values of the present fuel injection from the RAM 44.

The DMA transfer time of each A/D converted value is almost equal to an A/D conversion performing time at which the A/D conversion for obtaining the A/D converted value is actually performed in the A/D converter 41. When the DMA transfer time is delayed from the A/D conversion performing time, the control circuit 47 can obtain the A/D conversion performing time by subtracting this delay time from the DMA transfer time. Alternatively, the control circuit 47 can obtain the A/D conversion performing time from the timer 45 when the A/D conversion is actually performed in the A/D converter 41. In this case, the control circuit 47 may control the RAM 44 to store the A/D converted values with the respective A/D conversion performing times denoting time information.

Further, in the NE pulse interruption process performed in each of the single-shot timer trigger A/D conversion mode and the repeating timer trigger A/D conversion mode, the CPU 42 sets the opening start time Tpon in the timer 49 corresponding to the injector Ix. More specifically, the timer 49 receives information indicating this start time from the CPU 42 and is set so as to generate an energizing signal changed to the high level at the start time.

Moreover, in the NE pulse interruption process or a process other than the NE pulse interruption process, the control circuit 47 controls the A/D converter 41 to receive the analog sensing signals, indicating the operating states of the engine 13, through the input circuit 35 and to convert the sensing signals into digital values indicating the operating states of the engine 13.

In an injected fuel calculating process performed at equal intervals, the CPU 42 calculates a required quantity of the injected fuel (hereinafter, called a required fuel quantity) by using these digital values and stores the required quantity in the RAM 44. This required fuel quantity denotes a quantity of fuel required to be injected from the injector Ix to the cylinder #x. This calculation is well known, so that any detail description of this calculation is omitted.

The CPU 42 performs the injection end setting interruption process after the completion of the NE pulse interruption process. That is, the CPU 42 reads outs the required fuel quantity from the RAM 44. The CPU 42 determines a fuel inject ion period of time, needed to drive the engine 13 at the operating states, from the A/D converted value (or the A/D converted values) and the required quantity of injected fuel, and determines a valve closing operation start time (hereinafter, called a closing start time) Tpoff from the fuel injection period and the opening start time Tpon. The closing start time Tpoff denotes a time at which the driving circuit 37 starts the valve closing operation for the corresponding injector Ix. The CPU 42 sets this closing start time Tpoff in the timer 49 corresponding to the injector Ix before the closing start time Tpoff actually comes. That is, the timer 49 receives information indicating the closing start time Tpoff from the CPU 42 and is set so as to generate an energizing signal changed to the low level at the closing start time Tpoff.

Each of the timers 49 forms an energizing signal having pulses under control of the CPU 42 and outputs this signal to the corresponding driving circuit 37. The driving circuit 37 supplies electric power to the coil of the corresponding injector Ix in response to each high level (i.e., active level) of the energizing signal to open the injector Ix. When the energizing signal is returned to a low level (i.e., a non-active level), the driving circuit 37 stops the electric power supply to the coil of the injector Ix to close the injector Ix.

Each timer 49 has a first comparator for comparing the present time of the timer 45 and the opening start time Tpon set by the CPU 42 and a second comparator for comparing the present time of the timer 45 and the closing start time Tpoff set by the CPU 42. Therefore, the timer 49 can detect that the opening start time Tpon has actually arrived, and the timer 49 corresponding to the injector Ix can be set to output the energizing signal changed to the high level when the opening start time Tpon has come. Further, the timer 49 can detect that the closing start time Tpoff actually comes, and the timer 49 can be set to output the energizing signal changed to the low level when the closing start time Tpoff has come. The opening start time Tpon denotes an on time of the energizing signal, and the closing start time Tpoff denotes an off time of the energizing signal.

In this embodiment, the microcomputer 31 has the timers 49 corresponding to the injectors I1 to I4. However, the microcomputer 31 may have a single timer 49 used for the injectors I1 to I4.

The valve opening and closing operations performed by each driving circuit 37 will be described with reference to FIG. 2. FIG. 2 is a time chart showing a change of a fuel pressure at the inlet of each injector and a change of a fuel pressure in the common rail 15 in response to the energizing signal.

As shown in FIG. 2, each timer 49 sends the energizing signal to the corresponding driving circuit 37. This energizing signal has a leading edge at the opening start time Tpon and has a trailing edge at the closing start time Tpoff. In response to the leading edge of the energizing signal, the driving circuit 37 starts its valve opening operation for the corresponding injector Ix, and the injector Ix actually starts its valve opening movement at an actual fuel injection start time Tion which is delayed by a valve opening delay time Td1 from the opening start time Tpon. In contrast, in response to the trailing edge of the energizing signal, the driving circuit 37 starts its valve closing operation for the injector Ix, and the injector Ix actually ends its valve closing movement at an actual fuel injection end time Tioff which is delayed by a valve closing delay time Td2 from the closing start time Tpoff. Each of the delay times Td1 and Td2 is determined from characteristics of the injector Ix and the driving circuit 37. When the injector Ix actually starts the valve opening movement, the fuel pressure at the inlet of the injector is drastically dropped. During the valve closing movement of the injector Ix, the fuel pressure at the inlet of the injector is increased. In contrast, the fuel pressure of the common rail 15 is gradually decreased after the actual start time Tion until the actual end time Tioff. When the injector Ix actually ends the valve closing movement, the fuel pressure at the inlet of the injector and the fuel pressure of the common rail 15 become constant.

In this embodiment, the A/D conversion time is set to be delayed from the opening start time Tpon by a period of time shorter than the valve opening delay time Td1. Therefore, the A/D conversion time is placed between the start times Tpon and Tion. It is preferred that the A/D conversion time be set so as to be close to the actual start time Tion.

The processing for performing the fuel injection control in the CPU 42 in the single-shot timer trigger A/D conversion mode while using the computer program stored in the ROM 43 will be described. The CPU 42 initially performs the NE pulse interruption process to determine the opening start time Tpon (i.e., the on time of the energizing signal) and the A/D conversion time of the fuel pressure signal. After the completion of the NE pulse interruption process, the CPU 42 performs the injection end setting interruption process to determine the closing start time Tpoff (i.e., the off time of the energizing signal).

Figure 5:
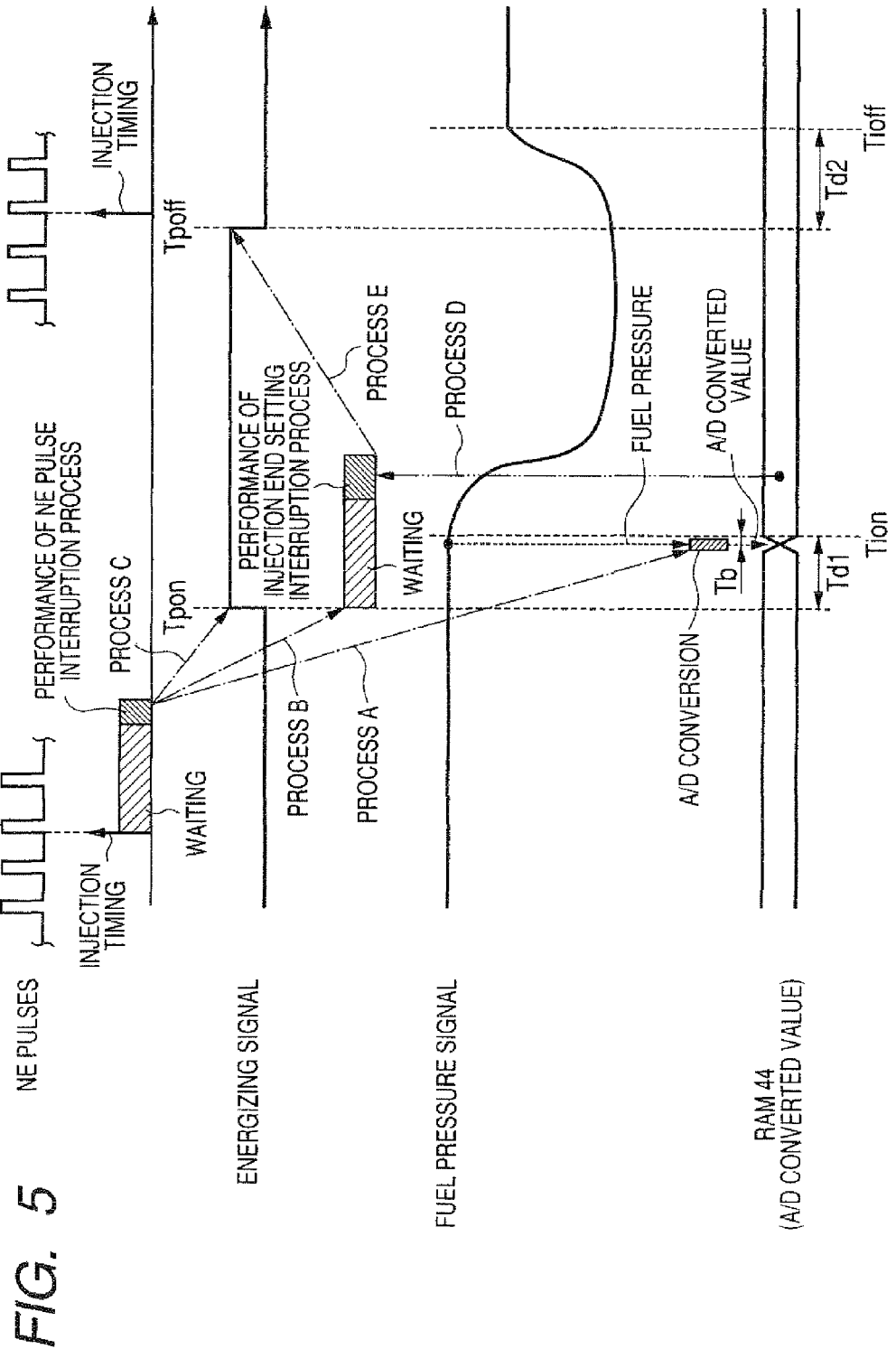
FIG. 5 is a time chart showing periods of the interruption processes in a single-shot timer trigger A/D conversion mode according to the first embodiment.

FIG. 3 is a flow chart showing the NE pulse interruption process ac cording to the first embodiment, while FIG. 4 is a flow chart showing the injection end setting interruption process according to the first embodiment. FIG. 5 is a time chart showing periods of the interruption processes in the single-shot timer trigger A/D conversion mode.

The NE pulse interruption process is started in response to an NE interruption request which is generated in the capturing unit 46 in synchronization with the leading edge of each NE pulse. Therefore, this NE pulse interruption process is performed each time the crankshaft of the engine 13 is rotated by the predetermined angle (e.g., 10 degrees).

As shown in FIG. 3, each time the CPU 42 starts the NE pulse interruption process in response to the NE interruption request, at step S110, the CPU 42 judges whether or not it is now an injection setting timing. The CPU 42 intends to set the opening start time Tpon in the timer 49 when the rotational angle of the crankshaft has a specific value. Therefore, at this injection setting timing, the rotational angle of the crankshaft has the specific value. For example, the injection setting timing corresponds to a timing at which the crankshaft is placed before the top dead center (TDC) of the cylinder #x by a predetermined crank angle.

In the case of a negative judgment, this NE pulse interruption process is ended. In contrast, in the case of an affirmative judgment, the CPU 42 continues this NE pulse interruption process. That is, at step S115, the CPU 42 determines an opening start time Tpon (i.e., the on time of the energizing signal) Tpon before the present time reaches the opening start time Tpon. More specifically, the fuel injection should be actually started when the crankshaft has a specific crank angle. The CPU 42 calculates a predicted time at which the crankshaft has the specific crank angle. This calculation is performed by using both the edge occurring time (i.e., a time of the injection setting timing) of one NE pulse stored in the capturing unit 46 and the rotational speed (i.e., engine speed) of the crankshaft. The rotational speed of the crankshaft is determined in advance from the interval between the leading edges of the NE pulses. Then, the CPU 42 calculates the opening start time Tpon which is earlier than the predicted time (i.e., the actual start time Tion) by the valve opening delay time Td1. The delay time Td1 is a fixed value which is experimentally preset or is calculated in advance.

At step S120, the CPU 42 performs a reserving process for reserving the A/D conversion of the fuel pressure signal. In this reserving process, the CPU 42 determines an A/D conversion channel and an A/D conversion time which should be set in the control circuit 47. Then, the CPU 42 sends information indicating the A/D conversion channel and information indicating the A/D conversion time to the ADC control circuit 47 to set the A/D conversion channel and the A/D conversion time in the control circuit 47 (refer to the process A in FIG. 5).

The A/D conversion channel indicates one input channel of the A/D converter 41, at which the fuel pressure signal of the injector Ix corresponding to the cylinder #x to be fuel-injected is received. The CPU 42 sets an arbitrary time placed in a non-injection period of time, which is from the actual fuel injection end time Tioff of the preceding injection to the actual fuel injection start time Tion of the present injection, as the A/D conversion time corresponding to the present injection. Preferably, the A/D conversion time is set to be later than the opening start time Tpon, and the A/D conversion time is set to be placed just before the actual start time Tion of the present injection. More specifically, the A/D conversion time is set to be earlier than the actual start time Tion by a constant shortened period of time Tb. The actual start time Tion is set so as to be later than the opening start time Tpon by the delay time Td1. The actual end time Tioff is set so as to be later than the closing start time Tpoff by the second delay time Td2.

Therefore, the control circuit 47 can control the A/D converter 41 to perform the A/D conversion of the fuel pressure signal which is sent at the A/D conversion time through the input channel of the A/D converter 41 indicated by the A/D conversion channel. This setting of the A/D conversion time is performed before the present time reaches the A/D conversion time.

At step S130, the CPU 42 performs the starting reservation for starting the injection end setting interruption process at the opening start time Tpon (refer to the process B in FIG. 5). In this starting reservation, the microcomputer 31 is preset to generate a fuel injection end setting interruption request at the opening start time Tpon determined in the CPU 42. In response to this interruption request, the CPU 42 starts the injection end setting interruption process in which the CPU 42 determines a closing start time (i.e., an off time of the energizing signal) Tpoff and sets the closing start time Tpoff in the timer 49.

For example, when the injection end setting interruption process is performed by the timer interruption, an interruption timer used for the timer interruption is set so as to generate a fuel injection end setting interruption request at the same time as the closing start time Tpoff set in the timer 49. Further, when the injection end setting interruption process is started in response to an interruption request generated in synchronization with a leading edge of the energizing signal, an interruption control register (not shown) located in the microcomputer 31 is set so as to enable the interruption process in response to the leading edge of the energizing signal. When the interruption control register is set in advance to enable the interruption process at the opening start time Tpon, the starting reservation of the interruption process at step S130 can be omitted.

At step S140, the CPU 42 sets the opening start time Tpon in the timer 49 corresponding to the injector #x (refer to the process C in FIG. 5). More specifically, the CPU 42 sends information indicating the opening start time Tpon to the timer 49 and sets the timer 49 to generate the energizing signal which is changed to the high level (i.e., activation level) at the opening start time Tpon. Therefore, the timer 49 can output the energizing signal, changed to the high level at the opening start time Tpon, to the injector #x. This setting of the opening start time Tpon in the timer 49 is performed before the present time reaches the opening start time Tpon.

Then, the NE pulse interruption process is completed.

As shown in FIG. 5, at the injection setting timing, the CPU 42 sometimes performs another process, having a priority higher than the priority of the NE pulse interruption process. Therefore, the performance of the NE pulse interruption is waited. When ending the process having the higher priority, the CPU 42 starts the NE pulse interruption process shown in FIG. 3. In the timer setting at step S140, the timer 49 is set so as to generate the energizing signal which is changed to the high level at the opening start time Tpon. In the starting reservation at step S130, the microcomputer 31 is set to generate the fuel injection end setting interruption request at the opening start time Tpon. In the reserving process at step S120, the CPU 42 sets a time, placed just before the actual start time Tion (Tion=Tpon+Td1) of the present injection, as the A/D conversion time.

Thereafter, when the opening start time Tpon has actually arrived, the timer 49 outputs the energizing signal, changed to the high level at the opening start time Tpon, to the driving circuit 37, and the driving circuit 37 performs the valve opening operation in response to the energizing signal to actuate the injector Ix. The opening movement of the injector Ix is actually started at the actual start time Tion later than the opening start time Tpon by the delay time Td1. Further, the microcomputer 31 generates a fuel injection end setting interruption request at the opening start time Tpon.

Further, when the A/D conversion time has actually arrived, the A/D conversion in the A/D converter 41 is started under control of the ADC control circuit 47. That is, the control circuit 47 controls the A/D converter 41 to receive a fuel pressure signal, indicating a fuel pressure at the inlet of the injector Ix, from the fuel sensor PS and to convert the signal into an A/D converted value at the A/D conversion time. This A/D converted value is stored in the specific region of the RAM 44 under control of the DMA controller 48. Because the control circuit 47 is operated independent of the operation of the CPU 42, this A/D conversion can be performed independent of the interrupt ion process of the CPU 42.

Here, each arrow expressed by the dot-dash-line in FIG. 5 indicates that the timing pointed by the arrow is set in the interruption process of the CPU 42.

When a fuel injection end setting interruption request is generated in the microcomputer 31 at the opening start time Tpon, the CPU 42 is once placed in the wait state by an interrupt latency time (see FIG. 5). This interrupt latency time is equal to or longer than a minimum interrupt latency time.

When the interrupt latency time has passed after the opening start time Tpon, the CPU 42 starts the injection end setting interruption process shown in FIG. 5. At step S210, the CPU 42 reads out the A/D converted value, calculated at the A/D conversion time, from the specific region of the RAM 44 (refer to the process D in FIG. 5).

In this embodiment, the A/D conversion time is set such that the A/D converted value is stored in the RAM 44 at a time earlier than the start time of the injection end setting interruption process. More specifically, because the DMA controller 48 completes the transfer of the A/D converted value to the RAM 44 at a DMA transfer time, the A/D conversion time is set such that a period of time from the opening start time Tpon to the DMA transfer time (i.e., a period of time determined by adding a transfer period of time, required to transfer the A/D converted value from the A/D converter 41 to the RAM 44, to a period of time Td1−Tb) becomes shorter than the minimum interrupt latency time defined from the generation of the fuel injection end setting interruption request to the start of the performance of the injection end setting interruption process.

Therefore, at the time when the injection end setting interruption process is started, the A/D conversion time has already passed, and both the A/D conversion of the fuel pressure signal performed in the A/D converter 41 and the transfer of the A/D converted value to the RAM 44 have been completed.

At step S220, the CPU 42 receives a required fuel quantity from the RAM 44. This required fuel quantity denotes a quantity of the fuel required to be injected from the injector Ix to the cylinder #x. The CPU 42 calculates in advance this required fuel quantity by using the operating states of the engine 13 and stores the calculated quantity in the RAM 44.

At step S230, the CPU 42 determines a fuel injection period of time from the A/D converted value denoting the fuel pressure and the required fuel quantity and determines a closing start time Tpoff from the fuel injection period and the opening start time Tpon. During the fuel injection period, the injector Ix is required to be opened and to inject fuel by the required fuel quantity. More specifically, the CPU 42 calculates a quantity of the injected fuel per unit time by using the A/D converted value, and calculates the fuel injection period by using the required fuel quantity and the quantity of the injected fuel per unit time. Further, the CPU 42 determines a time, passed by the fuel injection period from the opening start time Tpon, as the closing start time Tpoff.

The fuel injection period becomes longer as the required fuel quantity is increased and as the A/D converted value is decreased. In this embodiment, it is regarded that the valve opening delay time Td1 is equal to the valve closing delay time Td2. Therefore, the fuel injection period is equal to an actual fuel injection period of time from the actual fuel injection start time Tion to the actual fuel injection end time Tioff. However, when the difference between the delay times Td1 and Td2 should be considered, the determined fuel injection period is shortened by a value of "Td2−Td1" (Td2>Td1) or is lengthened by a value of "Td1−Td2" (Td2<Td1) to determine a corrected fuel injection period, and a time, passed by the corrected fuel injection period from the opening start time Tpon, is determined as the closing start time Tpoff.

At step S240, the CPU 42 sets the closing start time Tpoff in the timer 49 corresponding to the injector #x (refer to the process E in FIG. 5). More specifically, the CPU 42 sends information indicating the closing start time Tpoff to the timer 49 and sets the timer 49 to generate the energizing signal which is changed to the low level (i.e., non-activation level) at the closing start time Tpoff. Therefore, the timer 49 can output the energizing signal, changed to the low level at the closing start time Tpoff, to the injector #x. This setting of the closing start time Tpoff is performed before the present time reaches the closing start time Tpoff. Then, the injection end setting interruption process is completed.

Thereafter, when the closing start time Tpoff has actually arrived, the timer 49 changes the energizing signal to the low level (see FIG. 5). In response to the energizing signal, the driving circuit 37 performs the valve closing operation for the injector Ix to stop the power supply to the injector Ix and to end the closing movement of the injector Ix at the actual end time Tioff.

As described above, the CPU 42 performs the NE pulse interruption process to determine the opening start time Tpon (i.e., the on time of the energizing signal) and the A/D conversion time, to set the A/D conversion time in the control circuit 47 and to set the opening start time Tpon in the timer 49. After this interruption process, the driving circuit 37 starts the valve opening operation for the injector Ix at the opening start time Tpon in response to the energizing signal changed to the high level by the timer 49 at the opening start time Tpon.

Further, the control circuit 47 controls the ADC 49 to perform the A/D conversion of the fuel pressure signal, indicating the fuel pressure detected at the A/D conversion time, into the A/D converted value at the A/D conversion time. The DMA controller 48 controls the RAM 44 to store the A/D converted value. After the completion of the NE pulse interruption process, the CPU 42 performs the injection end setting interruption process to determine the closing start time Tpoff from the A/D converted value stored in the RAM 44 and to set the closing start time Tpoff in the timer 49. After the injection end setting interruption process, the driving circuit 37 starts the valve closing operation for the injector Ix at the closing start time Tpoff in response to the energizing signal changed to the low level by the timer 49 at the closing start time Tpoff.

Therefore, the ECU 11 does not perform the A/D conversion in either the NE pulse interruption process or the injection end setting interruption process. In other words, the A/D conversion under control of the ADC control circuit 47 is performed independent of the interruption processes performed in the CPU 42. In this case, the CPU 42 can arbitrarily set a time placed in a non-injection period as the A/D conversion time. For example, the A/D conversion time is set between the actual fuel injection end time Tioff of the preceding injection and the actual fuel injection start time Tion of the present injection.

In this case, assuming that the CPU 42 is needed to perform another process, having a priority higher than the priority of the injection end setting interruption process, in a period of time from the opening start time Tpon to the actual start time Tion, the start time of the injection end setting interruption process becomes later than the actual start time Tion. However, as shown in FIG. 5, even when the injection end setting interruption process is started after the actual start time Tion, the CPU 42 calculates the closing start time Tpoff in the injection end setting interruption process by using the A/D converted value obtained just before the actual start time Tion.

Accordingly, the ECU (i.e., fuel injection control device) 11 can reliably prevent the CPU 42 from undesirably calculating the fuel injection period and the closing start time Tpoff by using the detected value of the fuel pressure which is lowered due to the fuel injection. In this case, as compared with the conventional control device, the ECU 11 can control a quantity of the fuel, actually injected into each cylinder, to the required fuel quantity with higher precision.

Further, the NE pulse interruption process for the present fuel injection is sometimes performed during the preceding fuel injection. In this case, because no A/D conversion of a fuel pressure signal is performed during the NE pulse interruption process, in the NE pulse interruption process, the A/D conversion time can be reliably set in a non-injection period between the actual fuel injection end time Tioff of the preceding injection and the actual fuel injection start time Tion of the present injection. Accordingly, a quantity of the fuel actually injected into each cylinder can be controlled to the required fuel quantity with higher precision.

Moreover, the CPU 42 is sometimes needed to perform a specific process, having a priority higher than the priority of the NE pulse interruption process, in a period of time from the injection setting timing to the opening start time Tpon. In this case, the CPU 42 is placed in the wait state, and the CPU 42 starts the NE pulse interruption process after the completion of the specific process (see FIG. 5). However, because no A/D conversion of a fuel pressure signal is performed during the NE pulse interruption process, the NE pulse interruption process can be shortened by a period of time required for the A/D conversion. Accordingly, even when the CPU 42 is needed to perform the specific process, the CPU 42 can reliably complete the NE pulse interruption process until the opening start time Tpon.

Further, because no A/D conversion of a fuel pressure signal is performed during the injection end setting interruption process, a period of time required for the injection end setting interruption process can be shortened by a period of time required for the A/D conversion. Therefore, even when a period of time from the start time of the injection end setting interruption process to the closing start time Tpoff is shortened due to a shortened fuel injection period, the injection end setting interruption process can be reliably completed before the closing start time Tpoff. Accordingly, the ECU 11 can reliably set the closing start time Tpoff in the timer 49 in the injection end setting interruption process before the present time reaches the closing start time Tpoff, and the timer 49 can reliably output the energizing signal, changed to the low level at the closing start time Tpoff, to the driving circuit 37 at the closing start time Tpoff.

In this embodiment, the fuel injection end setting interruption request for starting the injection end setting interruption process is generated at the opening start time Tpon in the microcomputer 31. However, the injection end setting interruption process may be started in response to an A/D conversion completion interruption request which is generated in response to the completion of the A/D conversion performed in the A/D converter 41. In this case, at step S130 shown in FIG. 3, an interruption control register (not shown) of the microcomputer 31 is set so as to enable the injection end setting interruption process in response to the A/D conversion completion interruption request. When this setting of the interruption control register is performed at the start time of the injection end setting interruption process, the starting reservation of the injection end setting interruption process at step S130 can be omitted.

Further, in this embodiment, the CPU 42 calculates the required fuel quantity. However, another unit may calculate the required fuel quantity.

Second Embodiment

In this embodiment, the ECU 11 controls a quantity of the fuel injected into the cylinder #x of the engine 13 in the repeating timer trigger A/D conversion mode. That is, the ECU 11 according to the second embodiment differs from the ECU 11 according to the first embodiment in that the A/D conversion in the A/D converter 41 is repeatedly performed to perform one fuel injection into one cylinder #x.

The CPU 42 initially performs an NE pulse interruption process to determine the opening start time Tpon (i.e., the on time of the energizing signal) and a plurality of A/D conversion times. After the completion of the NE pulse interruption process, the CPU 42 performs an injection end setting interruption process to determine the closing start time Tpoff (i.e., the off time of the energizing signal).

Figure 6:
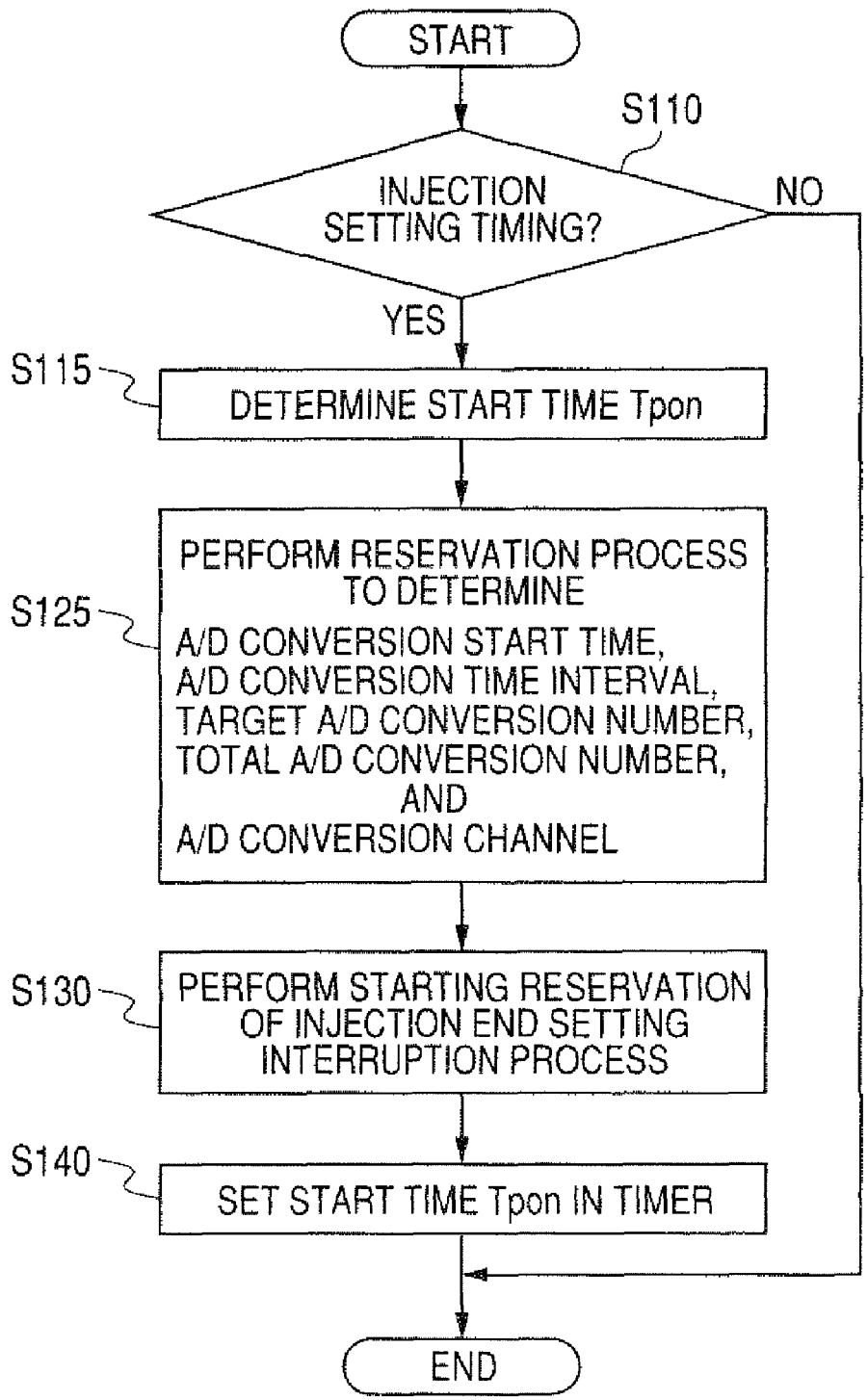
FIG. 6 is a flow chart showing an NE pulse interruption process according to the second embodiment of the present invention.
Figure 7:
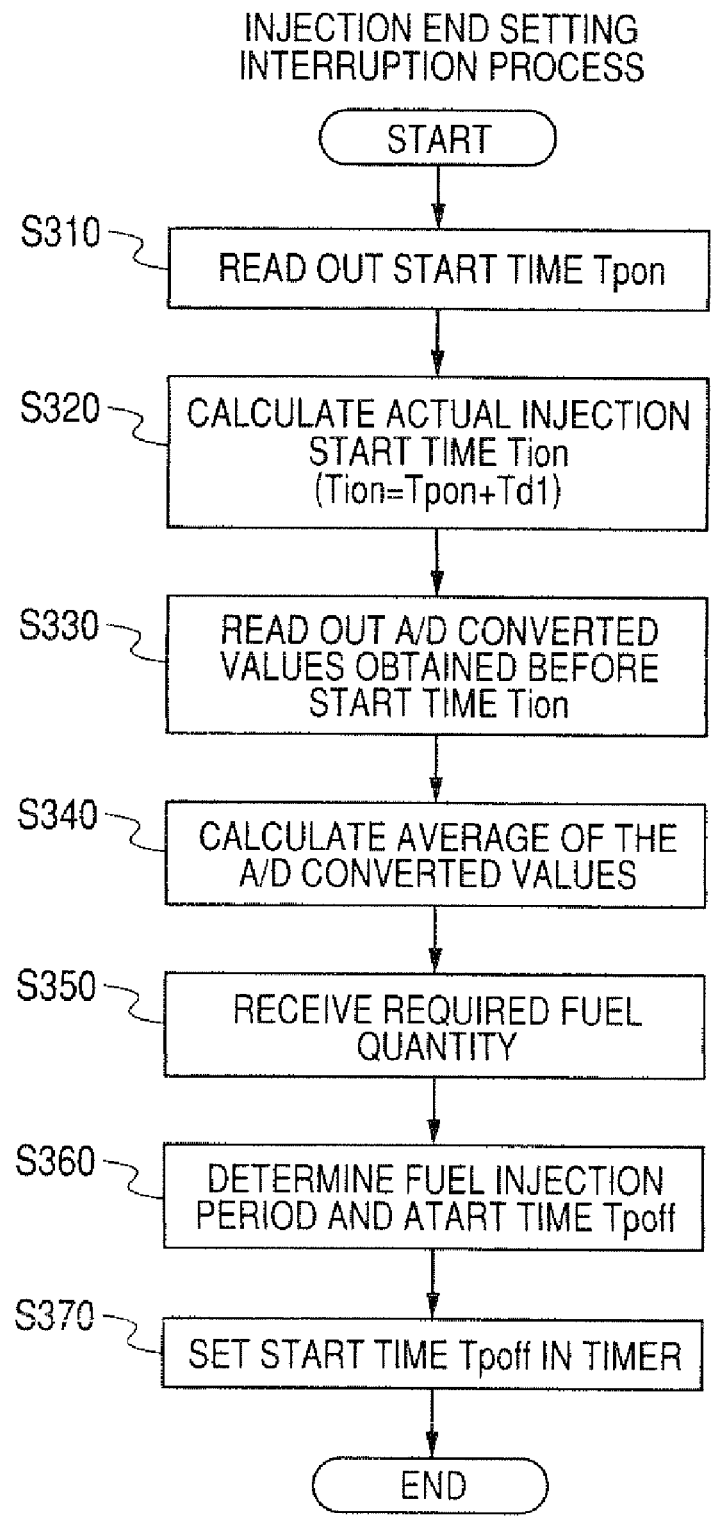
FIG. 7 is a flow chart showing an injection end setting interruption process according to the second embodiment.
Figure 8:
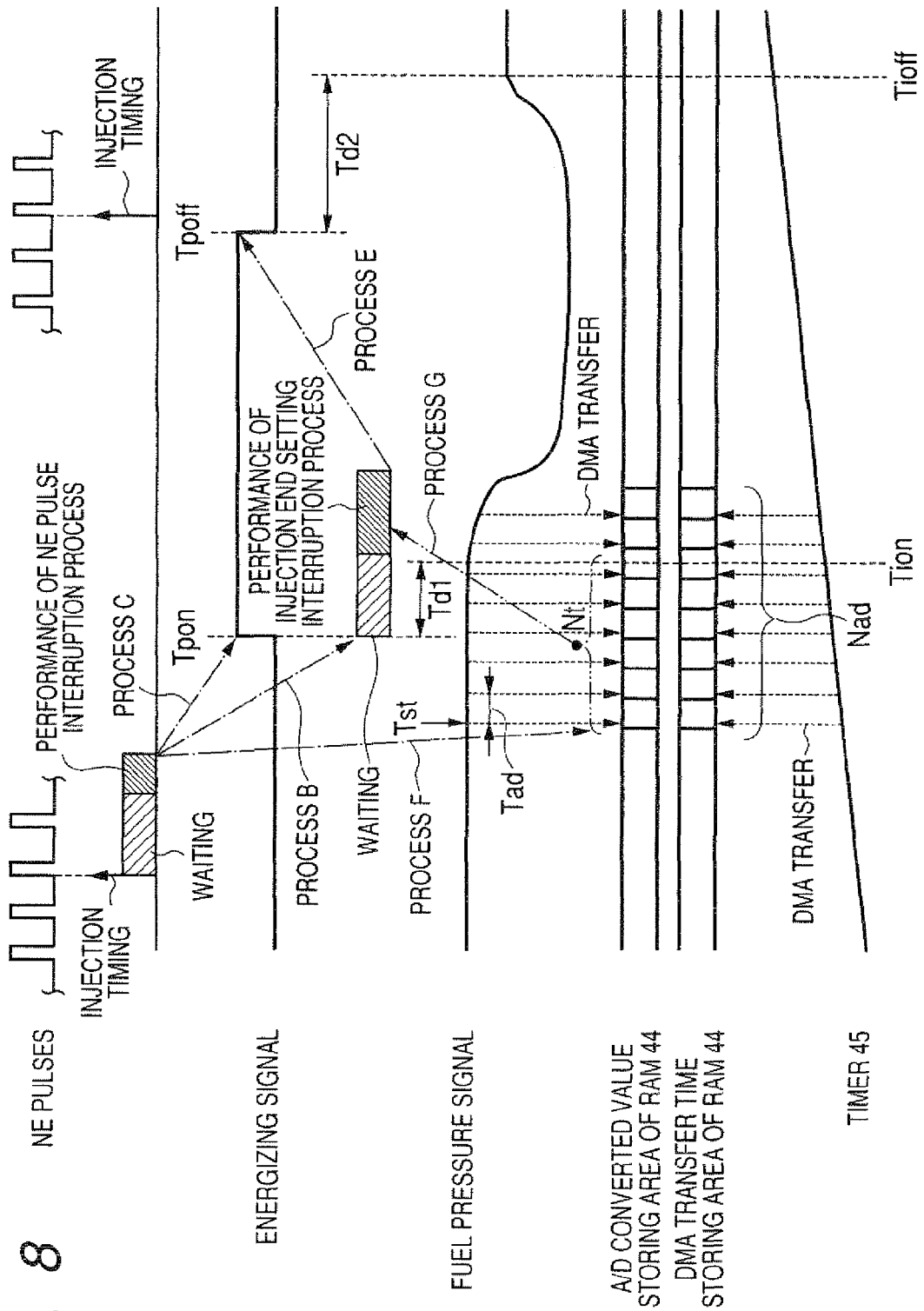
FIG. 8 is a time chart showing periods of the interruption processes in a repeating timer trigger A/D conversion mode according to the second embodiment.

FIG. 6 is a flow chart showing the NE pulse interruption process according to the second embodiment, while FIG. 7 is a flow chart showing the injection end setting interruption process according to the second embodiment. FIG. 8 is a time chart showing periods of the interruption processes in the repeating timer trigger A/D conversion mode.

As shown in FIG. 6 and FIG. 8, the NE pulse interruption process (i.e., a first process routine) is started in response to each NE interruption request in the same manner as in the first embodiment, and the judgment at step S110 and the determination of the opening start time Tpon at step S115 are performed in the same manner as in the first embodiment.

Thereafter, at step S125, the CPU 42 performs a reserving process for reserving the A/D conversion of the fuel pressure signal. In this reserving process, the CPU 42 determines an A/D conversion start time Tst, an A/D conversion channel, an A/D conversion time interval Tad, a target A/D conversion number Nt (Nt≧2) and a total A/D conversion number Nad (Nad>Nt). Then, the CPU 42 sends information indicating the conversion start time Tst, information indicating the conversion channel, information indicating the interval Tad, information indicating the number Nt and information indicating the number Nad to the ADC control circuit 47 to set the conversion start time Tst, the conversion channel, the time interval Tad, the number Nt and the number Nad in the control circuit 47 (refer to the process F in FIG. 8). Further, the CPU 42 clears the A/D converted value storing area and the DMA transfer time storing area of the RAM 44.

The conversion start time Tst is set to be placed in a non-injection period of time from the actual fuel injection end time Tioff of the preceding injection to the actual fuel injection start time Tion of the present injection. The control circuit 47 controls the A/D converter 41 to start a series of A/D conversions at the conversion start time Tst, and to repeatedly perform the A/D conversion by the A/D conversion number Nad at the A/D conversion time intervals Tad. The control circuit 47 controls the A/D converter 41 to repeatedly perform the A/D conversion by the target A/D conversion number Nt in a non-injection period of time from the conversion start time Tst to the actual start time Tion of the present fuel injection. The conversion start time Tst and the A/D conversion time interval Tad are set such that the A/D conversion can be repeated by the target A/D conversion number Nt in the period from the conversion start time Tst to the actual start time Tion of the present fuel injection. The control circuit 47 uses the A/D conversion channel in the same manner as in the first embodiment.

In FIG. 8, the example set at Nad=8 and Nt=6 is shown. Each of the numbers Nt and Nad may be changeable or fixed.

Thereafter, in the same manner as in the first embodiment, at steps S130 and S140, the CPU 42 performs the starting reservation of the injection end setting interruption process and the setting of the opening start time Tpon in the timer 49.

After the completion of the NE pulse interruption process, when the conversion start time Tst has actually arrived, the operation of the A/D converter 41 is started under control of the ADC control circuit 47. In this operation, the A/D converter 41 receives a plurality of fuel pressure signals one after another from the fuel sensor PS at the A/D conversion time intervals Tad until the number of signals reaches the A/D conversion number Nad. Each signal indicates the fuel pressure at the inlet of the injector Ix at the signal reception time. This reception of the signals is started at the conversion start time Tst. Each time the A/D converter 41 receives one fuel pressure signal, the A/D converter 41 immediately converts the signal into an A/D converted value, stores this A/D converted value in one region of the A/D converted value storing area of the RAM 44, and stores the DMA transfer time of the A/D converted value in one region of the DMA transfer time storing area of the RAM 44. Each of the A/D converted values is associated with the corresponding DMA transfer time in the RAM 44.

When the opening start time Tpon has actually arrived, the driving circuit 37 actuates the injector Ix in response to the energizing signal sent from the timer 49 to perform the opening operation for the injector Ix. Further, the microcomputer 31 generates a fuel injection end setting interruption request at the opening start time Tpon.

Thereafter, the CPU 42 performs the injection end setting interruption process (i.e., a second process routine) in response to the fuel injection end setting interruption request. This process will be described with reference to FIG. 7.

As shown in FIG. 7, at step S310, the CPU 42 reads out the opening start time Tpon from the RAM 44 or the timer 49.

At step S320, the CPU 42 calculates an actual fuel injection start time Tion by adding the valve opening delay time Td1 to the opening start time Tpon (Tion=Tpon+Td1).

At step S330, the CPU 42 reads out a part of the A/D converted values, obtained before the actual start time Tion, from the RAM 44. More specifically, the CPU 42 selects DMA transfer times earlier than the actual start time Tion from the DMA transfer times stored in the DMA transfer time storing area of the RAM 44, and the CPU 42 selects A/D converted values, associated with the selected DMA transfer times, from the A/D converted values stored in the A/D converted value storing area of the RAM 44 (refer to the process G in FIG. 8). The number of selected A/D converted values is equal to the target A/D conversion number Nt.

At step S340, the CPU 42 calculates the average value of the selected A/D converted values. This average value is called an average fuel pressure value.

At step S350, the CPU 42 receives a required fuel quantity, corresponding to the operating states of the engine 13, from the RAM 44.

At step S360, the CPU 42 determines a fuel injection period of time from the required fuel quantity and the average fuel pressure value and determines a closing start time Tpoff which is later than the opening start time Tpon by the fuel injection period.

At step S370, the CPU 42 sends information indicating the closing start time Tpoff to the timer 49 corresponding to the injector #x to set the closing start time Tpoff in the timer 49. Therefore, the timer 49 can output the energizing signal changed to the low level (i.e., non-activation level) at the closing start time Tpoff, to the injector #x. This setting of the closing start time Tpoff is performed before the present time reaches the closing start time Tpoff (refer to the process E in FIG. 8). Then, the injection end setting interruption process is completed.

Thereafter, when the closing start time Tpoff has actually arrived, the timer 49 changes the energizing signal to the low level (see FIG. 8). In response to this energizing signal, the driving circuit 37 performs the valve closing operation to stop the power supply to the injector Ix and to end the closing movement of the injector Ix at the actual end time Tioff.

As described above, in the second embodiment, the same effects as those in the first embodiment can be obtained. Further, because the CPU 42 calculates the fuel injection period and the closing start time Tpoff by using the average of a plurality of A/D converted values, the influence of noise superimposed on the fuel pressure signals and/or ripple occurring in the fuel pressure signals can be suppressed. The ripple is caused by the fuel injections of the injectors I1 to I4 and/or the pressurization of the fuel performed by the fuel pump 21. Accordingly, the ECU 11 can further heighten the precision in the control of a quantity of the fuel injected into each cylinder.

Moreover, because none of the A/D conversions in the A/D converter 41 is performed in the injection end setting interruption process, the period of time required for this process can be shortened. Accordingly, the ECU 11 can reliably set the closing start time Tpoff in the timer 49 in the injection end setting interruption process before the present time reaches the closing start time Tpoff, and the timer 49 can reliably output the energizing signal, changed to the low level at the closing start time Tpoff, to the driving circuit 37 at the closing start time Tpoff.

Further, in the second embodiment, the DMA controller 48 controls the RAM 44 to store the A/D converted values and the DMA transfer times (or the A/D conversion performing times) while associating each A/D converted value with the corresponding DMA transfer time. Therefore, the CPU 42 is not required to calculate the DMA transfer time (or the A/D conversion performing time) of any A/D converted value by using the A/D conversion start time Tst, the A/D conversion time interval Tad and the A/D conversion order of the A/D converted value. Accordingly, because the CPU 42 can omit this calculation, the CPU 42 can easily and rapidly select the A/D converted values, associated with the DMA transfer times earlier than the actual start time Tion, from the DMA transfer times of the RAM 44 to calculate the average of the selected A/D converted values.

First Modification, Relating to Second Embodiment

In the second embodiment, the A/D conversion number Nad is set to be higher than the target A/D conversion number Nt (Nad>Nt). Therefore, all A/D conversions, of which the number is equal to the conversion number Nad and which are stored in the RAM 44, are not performed during the non-injection period from the actual end time Tioff of the preceding injection to the injection start time Tion of the present injection. In the injection end setting interruption process, the CPU 42 determines a fuel injection period and a closing operation start time Tpoff from the average of the A/D converted values which are obtained in A/D conversions performed before the injection start time Tion of the present injection.

However, the A/D conversion number Nad may be set to be equal to the target A/D conversion number Nt (Nad=Nt) so as to store all A/D converted values, calculated in the ADC 41, in the RAM 44 before the injection start time Tion. In this case, as shown in FIG. 8, when the reading of the A/D converted values from the RAM 44 is started after the actual start time Tion at step S330 in the injection end setting interruption process, the CPU 42 determines a fuel injection period and a closing operation start time Tpoff in the injection end setting interruption process from the average of all A/D converted values stored in the RAM 44.

Second Modification, Relating to Second Embodiment

In the second embodiment, the CPU 42 selects all A/D converted values, which are obtained in the A/D conversions performed before the injection start time Tion of the present injection, to calculate the average of the selected A/D converted values and to determine the fuel injection period and the closing operation start time Tpoff from the average.

However, after storing all A/D converted values, obtained before the injection start time Tion of the present injection, in the RAM 44, the CPU 42 may select two A/D converted values or more, which are obtained at A/D conversion times closest to the actual start time Tion of the present injection among the A/D conversion times of the stored A/D converted values, from the stored A/D converted values. The CPU 42 determines a fuel injection period and a closing operation start time Tpoff from the average of the selected A/D converted values.

Third Modification, Relating to Second Embodiment

In the second embodiment, the conversion start time Tst is set to be later than the actual end time Tioff of the preceding injection. Therefore, the CPU 42 necessarily selects A/D converted values, which are obtained in A/D conversions performed after the actual end time Tioff of the preceding injection, to calculate the average of the selected A/D converted values.

However, the conversion start time Tst may be set to be earlier than the injection start time Tion of the present injection. In this case, the CPU 42 additionally calculates the actual end time Tioff of the preceding injection by adding the second delay time Td2 to the closing operation start time Tpoff of the preceding injection (step S320 shown in FIG. 7). The CPU 42 selects all A/D converted values, which are obtained in A/D conversions performed after the calculated actual end time Tioff of the preceding injection and before the injection start time Tion of the present injection, or selects two A/D converted values or more, which are obtained in A/D conversions performed at conversion times closest to the injection start time Tion of the present injection among conversion times of all A/D conversions (step S330). The CPU 42 calculates the average of the selected A/D converted values (step S340).

Accordingly, even when the conversion start time Tst is set at step S125 shown in FIG. 6 so as to be earlier than the actual end time Tioff of the preceding injection, the CPU 42 selects no A/D converted values which are obtained in A/D conversions performed during the fuel injection.

Fourth Modification, Relating to Second Embodiment

In the second embodiment, two A/D converted values or more are selected from a plurality of /D converted values. However, the CPU 42 may select only one A/D converted value, which is obtained in the A/D conversion performed at a conversion time closest to (or just before) the injection start time Tion of the present injection among conversion times of all A/D conversions, from the A/D converted values obtained in the all A/D conversions (step S330). The CPU 42 determines a fuel injection period and a closing operation start time Tpoff from the selected A/D converted value (step S360). In this case, the CPU 42 requires no average calculation at step S340 shown in FIG. 7.

Accordingly, even when the conversion start time Tst is set so as to be earlier than the actual end time Tioff of the preceding injection, the ECU 11 can control a quantity of the injected fuel with high precision.

Fifth Modification, Relating to Second Embodiment

In the second embodiment, the ripple sometimes occurs in the fuel pressure signals. This signal ripple is caused by the fuel injection of the injectors I1 to I4 and/or the pressurization of the fuel performed by the fuel pump 21. The signal level is periodically changed with time due to the signal ripple. To effectively suppress the influence of the signal ripple on the control of the ECU 11, it is preferred to calculate a plurality of A/D converted values at equal time intervals in one ripple period or in each of ripple periods and to determine the closing start time Tpoff from the average of the A/D converted values.

In this modification, the CPU 42 determines an A/D conversion time interval Tad equal to 1/M (M is an even number equal to or higher than four) of one ripple period, and the CPU 42 selects a plurality of A/D converted values obtained in A/D conversions which are performed at equal time intervals equal to 1/N (N is an even number equal to or higher than two and lower than M) of one ripple period in L (L is an integer equal to or higher than one) ripple periods. That is, the number of A/D converted values selected by the CPU 42 is equal to L×N, and the CPU 42 substantially selects the A/D converted values at the A/D conversion time interval Tad equal to 1/N of one ripple period in L ripple periods. Then, the CPU 42 calculates the average of the selected A/D converted values and determines a fuel injection period and a closing start time Tpoff from the average. For example, M=8, N=2 and L=3 are set.

Therefore, one A/D converted value is selected from M/N converted values every 1/N ripple period in L ripple periods, and none of (M/N−1) converted values is selected every 1/N ripple period.

Accordingly, because the average of the selected A/D converted values can indicate the level of the fuel pressure signal without being influenced by the ripple, the ECU 11 can control a quantity of the injected fuel with higher precision.

Sixth Modification, Relating to Second Embodiment

In this modification, the CPU 42 sets the A/D conversion time interval Tad so as to be equal to 1/N (N is an even number equal to or higher than two) of one ripple period, and the CPU 42 selects all A/D converted values (of which the number is equal to L×N) obtained in the A/D conversions, which are performed at the conversion time intervals Tad in L (L is an integer equal to or higher than one) ripple periods, to calculate the average of the selected A/D converted values and to determine the fuel injection period and the closing operation start time Tpoff from the average.

Accordingly, the same effects as those in the fifth modification can be obtained.

This setting of the A/D conversion time interval Tad and the selection of the A/D converted values in this modification can be also applied to the first to third modifications.

Third Embodiment

In this embodiment, each of the injectors I1 to I4 performs a short-term injection. That is, each injector performs the injection in a short injection period of time. In the case of this short-term injection, when the injection end setting interruption process is performed in response to a request generated at the opening start time Tpon, an injection period of time determined in this interruption process is too short to set the closing start time Tpoff, determined in the CPU 42, in the timer 49 before the closing start time Tpoff. Therefore, assuming that the NE pulse interruption process shown in FIG. 3 is performed in the case of the short-term injection to output an injection end setting interruption request at the opening start time Tpon, the CPU 42 cannot set the closing start time Tpoff in the timer 49 before the closing start time Tpoff.

To reliably set the closing start time Tpoff in the timer 49 before the closing start time Tpoff in the case of the short-term injection, another NE pulse interruption process according to the third embodiment is performed.

Figure 9:
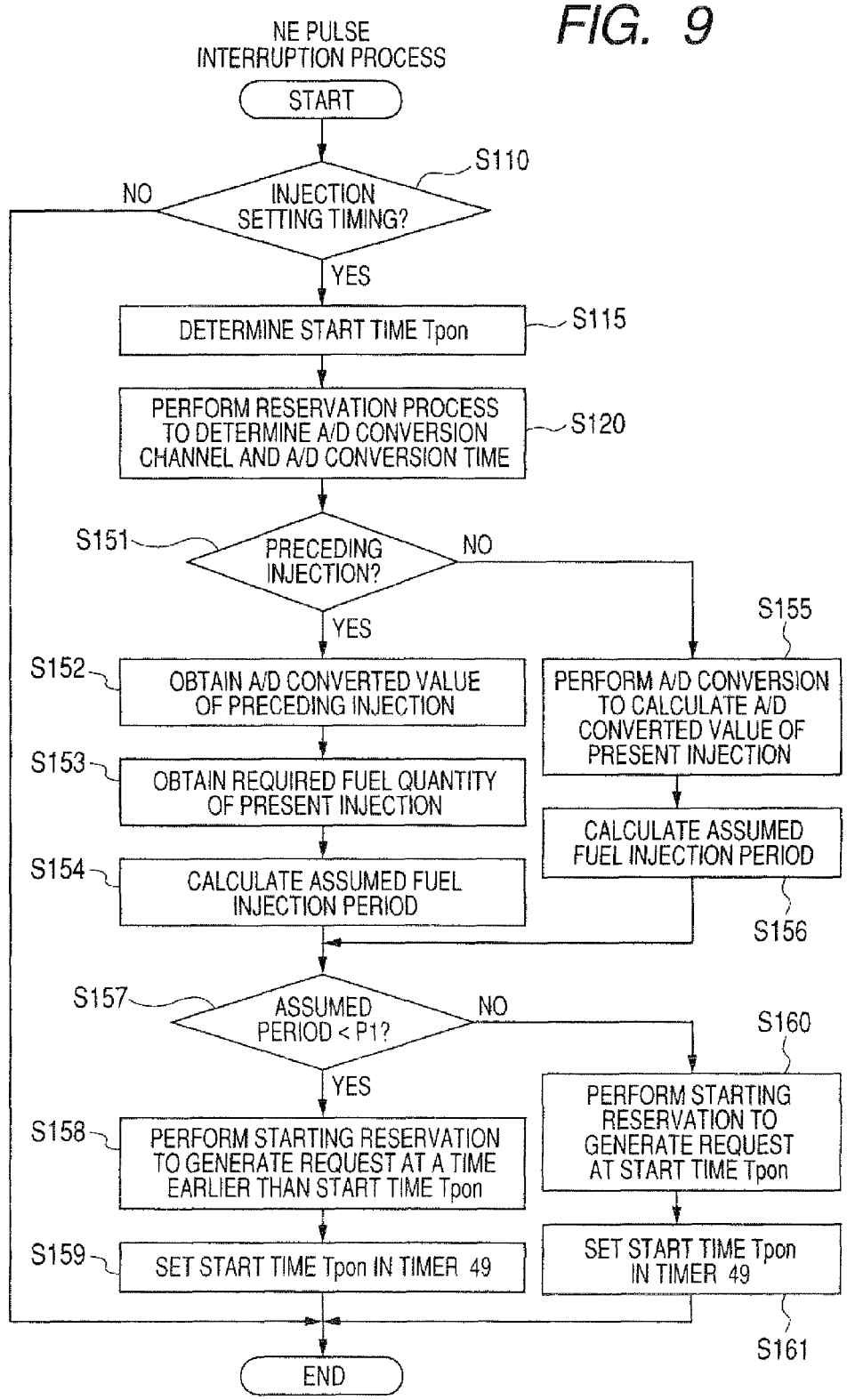
FIG. 9 is a flow chart showing the NE pulse interruption process according to the third embodiment of the present invention.

FIG. 9 is a flow chart showing the NE pulse interruption process according to the third embodiment.

As shown in FIG. 9, after the processes at step S110, S115 and S120 are performed in the same manner as those shown in FIG. 3, the CPU 42 judges whether or not the present injection is a short-term injection. To perform this judgment, at step S151, the CPU 42 judges whether or not the injector Ix is now performing the preceding injection of the multistage injection to inject fuel into the cylinder #x. More specifically, the CPU 42 judges whether or not the present time indicated by the timer 45 is placed between the actual fuel injection start time Tion of the preceding injection and the actual fuel injection end time Tioff of the preceding injection. The CPU 42 calculates this start time Tion by adding the first delay time Td1 to the opening start time Tpon already calculated for the preceding injection and calculates this end time Tioff by adding the second delay time Td2 to the closing start time Tpoff already calculated for the preceding injection.

When the present time is between the actual start time Tion and the actual end time Tioff (YES at step S151), the CPU 42 judges that the injector Ix is now performing the preceding injection of the multistage injection. Then, at step S152, the CPU 42 obtains the A/D converted value, calculated in the NE pulse interruption process for the preceding injection (refer to step S120 shown in FIG. 3), from the specific region of the RAM 44. This A/D converted value has been already calculated in the A/D converter 41 at the A/D conversion time of the preceding injection. Then, at step S153, the CPU 42 obtains the required fuel quantity of the present injection which has been calculated in the CPU 42 in advance and stored in the RAM 44 (refer to step S220 shown in FIG. 4). Then, at step S154, by using the obtained A/D converted value and this required fuel quantity, the CPU 42 calculates a fuel injection period of time required to inject fuel by the required fuel quantity, in the same manner as the calculation at step S230 shown in FIG. 4. This calculated fuel injection period denotes an assumed fuel injection period of the present injection and differs from a fuel injection period of the present injection which is expected to be calculated in the injection end setting interruption process for the present injection.

In contrast, when the present time is not between the actual start time Tion and the actual end time Tioff (NO at step S151) of the preceding injection, the CPU 42 judges that the injector Ix has not yet performed the preceding injection of the multistage injection. Then, at step S155, the CPU 42 controls the ADC control circuit 47 such that the control circuit 47 controls the A/D converter 41 to perform the A/D conversion of the fuel pressure signal, indicating the fuel pressure at the present time, into an A/D converted value and to send this A/D converted value to a register of the control circuit 47, and the CPU 42 obtains the A/D converted value from the control circuit 47.

Then, at step S156, the CPU 42 calculates a fuel injection period of time by using the obtained A/D converted value and the required fuel quantity of the present injection, in the same manner as the calculation at step S230 shown in FIG. 4. This calculated fuel injection period denotes an assumed fuel injection period of the present injection and differs from a fuel injection period of the present injection which is expected to be calculated in the injection end setting interruption process for the present injection.

After the step S154 or S156, at step S157, the CPU 42 judges whether or not the assumed fuel injection period of the present injection calculated at step S154 or step S156 is shorter than a predetermined period P1. When the fuel injection period is shorter than the predetermined period P1 (YES at step S157), the CPU 42 judges the present injection to be a short-term injection. In contrast, when the fuel injection period is not shorter than the predetermined period P1 (NO at step S157), the CPU 42 judges the present injection not to be a short-term injection.

The procedure at steps S151 to S159 is performed because it is unknown whether or not the present injection is a short-term injection. However, in the case where the CPU 42 knows that an injection placed at a specific position of the multistage injection is a short-term injection, to determine the opening start time Tpon for this injection of the multistage injection, the CPU 42 may judge, without performing the procedure at steps S151 to S159, that the present injection is a short-term injection.

Thereafter, when the CPU 42 judges the present injection to be a short-term injection (YES at step S157), at step S158, the CPU 42 performs the starting reservation of the injection end setting interruption process. In this starting reservation, the microcomputer 31 is set to generate and output an injection end setting interruption request at an interruption request time earlier than the opening start time Tpon determined at step S115. Then, at step S159, the CPU 42 sets the opening start time Tpon in the timer 49 (refer to the process H in FIG. 10).

In contrast, when the CPU 42 judges the present injection not to be a short-term injection (NO at step S157), at step S160, the CPU 42 performs the starting reservation of the injection end setting interruption process in the same manner as step S130 shown in FIG. 3. That is, the microcomputer 31 is set to generate and output an injection end setting interruption request at the opening start time Tpon determined at step S115. Then, at step S161, the CPU 42 sets the opening start time Tpon in the timer 49 in the same manner as step S140 shown in FIG. 3.

Figure 10:
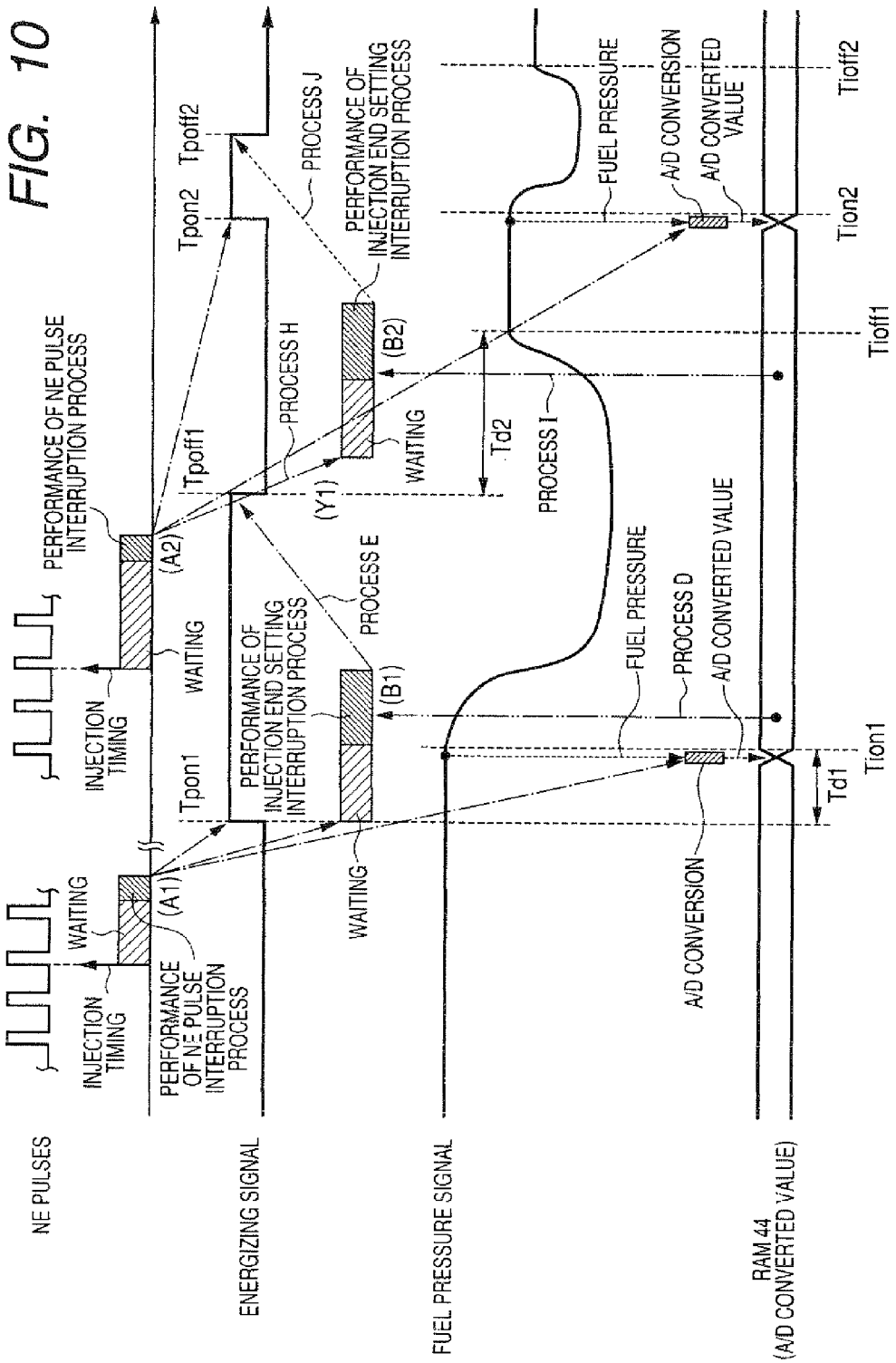
FIG. 10 is a time chart showing periods of the interruption processes in the single-shot timer trigger A/D conversion mode according to the third embodiment.

FIG. 10 is a time chart showing the period of the NE pulse interruption process and the period of the injection end setting interruption process in the single-shot timer trigger A/D conversion mode according to the third embodiment.

As shown in FIG. 10, in response to the judgment that the present injection is not a short-term injection, the NE pulse interruption process (A1) is performed, and the opening start time Tpon1 is determined and set in the timer 49. In response to the request which is set in the interruption process (A1) to be generated at the opening start time Tpon1, the injection end setting interruption process (B1) is performed, and the closing start time Tpoff1 is determined and set in the timer 49.

In contrast, in response to the judgment that the present injection is a short-term injection, the NE pulse interruption process (A2) is performed, the opening start time Tpon2 is determined and set in the timer 49, and the microcomputer 31 is set to generate an injection end setting interruption request at a request time earlier than the opening start time Tpon2. In response to this request, the injection end setting interruption process (B2) is performed at a request time earlier than the opening start time Tpon2, and the closing start time Tpoff2 is determined and set in the timer 49.

FIG. 11 is a flow chart showing the injection end setting interruption process according to the third embodiment. This interruption process is performed when an injection end setting interruption request is generated at a request time earlier than the opening start time Tpon in the case of the short-term injection.

As shown in FIG. 11, at step S410, the CPU 42 receives the A/D conversion time Tcon of the present injection, which has been stored in the RAM 44 and set in the ADC control circuit 47 in the NE pulse interruption process of the present injection, from the RAM 44 or the control circuit 47. At step S420, the CPU 42 receives information indicating the present time Tnow from the timer 45. At step S430, the CPU 42 compares the present time Tnow and the A/D conversion time Tcon and judges whether or not the A/D conversion time Tcon has already passed.

When the A/D conversion time Tcon has already passed (Tcon<Tnow, YES at step S430), at step S440, the CPU 42 reads out the A/D converted value of the present injection from the specific region of the RAM 44 (refer to the process D in FIG. 10). This A/D converted value has been calculated by the A/D converter 41 at the A/D conversion time, which is set in the control circuit 47 in the NE pulse interruption process of the present injection. The CPU 42 obtains the A/D converted value to calculate the fuel injection period and the opening start time Tpon in the present injection. This A/D converted value is called a present A/D converted value.

At step S450, the CPU 42 receives a required fuel quantity of the present injection, calculated in advance in the CPU 42 by using the operating states of the engine 13, from the RAM 44 in the same manner as the calculation at step S220 shown in FIG. 4.

At step S460, the CPU 42 determines a fuel injection period of time from the present A/D converted value and the required fuel quantity of the present injection received at step S450, in the same manner as the calculation at step S230 shown in FIG. 4. The fuel injection period is required to inject fuel from the injector Ix into the cylinder #x by the required quantity. Further, the CPU 42 determines a closing start time Tpoff from the fuel injection period and the opening start time Tpon. More specifically, a time elapsed from the opening start time Tpon by the fuel injection period is set as the closing start time Tpoff.

At step S470, the CPU 42 sets the closing start time Tpoff in the timer 49 corresponding to the injector #x in the same manner as the setting at step S240 shown in FIG. 4 (refer to the process E in FIG. 10). Then, this injection end setting interruption process is ended.

In contrast, when the A/D conversion time has not yet passed (Tcon≧Tnow, NO at step S430), the CPU 42 judges that the A/D converted value required for the determination of the fuel injection period and the closing start time Tpoff of the present injection has not been yet obtained. Therefore, at step S480, the CPU 42 reads out the A/D converted value of the preceding injection from the specific region of the RAM 44 (refer to the process I in FIG. 10). This A/D converted value has been already calculated at the A/D conversion time which is set in the control circuit 47 at step S120 in the NE pulse interruption process of the preceding injection performed before the injection end setting interruption process of the preceding injection. For example, when the preceding injection is not a short-term injection, the CPU 42 used this A/D converted value in the injection end setting interruption process of the preceding injection to calculate the fuel injection period and the opening start time Tpon for the preceding injection. This A/D converted value is called a preceding A/D converted value.

At step S490, the CPU 42 estimates a pressure (called an injection start time fuel pressure) of fuel, pressurized in the injector Ix at the actual start time Tion of the present fuel injection, from the preceding A/D converted value. The estimated value Pest of the injection start time fuel pressure is calculated according to an equation (1).

$$Pest = Po - \Delta Pinj - \Delta Pleak + \Delta Ppump \quad (1)$$

wherein Po denotes the preceding A/D converted value, $\Delta Pinj$ denotes a pressure drop of the fuel caused by the preceding fuel injection, $\Delta Pleak$ denotes a pressure drop of the fuel caused by the static fuel leak from the injector Ix, and $\Delta Ppump$ denotes a pressure rising of fuel pressurized by the pump 21. The static fuel leak denotes a fuel leak caused during the non-fuel injection.

The pressure drop $\Delta Pinj$ is calculated by using a quantity Qp of the fuel injected in the preceding injection, a quantity Qd1 of the dynamic fuel leak, a volume modulus Ev of elasticity of fuel, a volume Vc of the common rail 15.

$$\Delta Pinj = (Qp + Qd1) \times Ev \div Vc \quad (2)$$

The dynamic fuel leak denotes a fuel leak from the injector Ix caused during the fuel injection. The volume modulus Ev of elasticity indicates a change in the fuel volume caused by a change in the fuel pressure.

The pressure drop $\Delta Pleak$ is calculated by using a quantity Qs1 of the static fuel leak per unit time, the actual injection start time Tion2 in the present injection, the actual injection start time Tion1 in the preceding injection, Ev and Vc.

$$\Delta Pleak = Qs1 \times (Tion2 - Tion1) \times Ev \div Vc \quad (3)$$

The start time Tion1 is obtained by adding the first delay time Td1 to the opening start time Tpon1. The start time Tion2 is obtained by adding the first delay time Td1 to the opening start time Tpon2. The pressure rising $\Delta Ppump$ is calculated by using a quantity Qfp of the pressurized fuel per unit time, Tion2, Tion1, Ev and Vc.

$$\Delta Ppump = Qfp \times (Tion2 - Tion1) \times Ev \div Vc \quad (4)$$

The term Tion2−Tion1 in each of the pressure drop $\Delta Pleak$ and the pressure rising $\Delta Ppump$ may be replaced with the term Tpon2−Tpon1.

At step S500, the CPU 42 receives a required fuel quantity of the present injection, calculated in advance in the CPU 42 by using the operating states of the engine 13, from the RAM 44 in the same manner as the calculation at step S220 shown in FIG. 4.

At step S510, the CPU 42 calculates a quantity of the injected fuel per unit time by using the estimated value Pest of the injection start time fuel pressure, and determines a fuel injection period of the present injection from the quantity of the injected fuel per unit time and the required fuel quantity of the present injection received at step S500. Further, the CPU 42 determines a closing start time Tpoff of the present injection from the fuel injection period and the opening start time Tpon of the present injection. More specifically, a time elapsed from the opening start time Tpon by the fuel injection period is set as the closing start time Tpoff.

At step S520, the CPU 42 sets the closing start time Tpoff in the timer 49 corresponding to the injector #x in the same manner as the setting at step S240 shown in FIG. 4 (refer to the process J in FIG. 10). Then, this injection end setting interruption process is ended.

As described above, in the NE pulse interruption process for the present injection, when the present time is placed in a period of the fuel injection, to judge at the present time whether or not the present injection is a short-term injection, an assumed fuel injection ion period of the present injection is determined from the A/D converted value of the preceding injection and the required fuel quantity calculated for the present injection. When the present time is placed out of the period of the fuel injection, to judge at the present time whether or not the present injection is a short-term injection, an assumed fuel injection period of the present injection is determined from the A/D converted value, obtained from the fuel pressure signal detected at the present time, and the required fuel quantity calculated for the present injection. Then, when the assumed fuel injection period is short, the CPU 42 judges that the present injection is a short-term injection, and the microcomputer 31 is set such that the injection end setting interruption process for the present injection is started in response to a request generated before the opening start time Tpon of the present injection. In contrast, when the assumed fuel injection period is not short, the CPU 42 judges that the present injection is not a short-term injection, and the microcomputer 31 is set such that the injection end setting interruption process for the present injection is started in response to a request generated at the opening start time Tpon of the present injection.

Therefore, the ECU 11 can reliably judge each fuel injection to be a short-term injection or not to be a short-term injection and can start the injection end setting interruption process before the opening start time Tpon when the fuel injection is a short-term injection.

In case of the short-term injection, in the injection end setting interruption process for the present injection, when the present A/D conversion time determined in the NE pulse interruption process for the present injection has already passed at the present time, the fuel injection period is determined from the present A/D converted value calculated at the present A/D conversion time and the required fuel quantity calculated for the present injection, and the closing start time Tpoff is determined from this fuel injection period and the opening start time Tpon. In contrast, when the present A/D conversion time has not yet passed at the present time, the fuel injection period is determined from the preceding A/D converted value calculated at the preceding A/D conversion time, determined in the NE pulse interruption process for the preceding injection, and the required fuel quantity calculated for the present injection, and the closing start time Tpoff is determined from this fuel injection period and the opening start time Tpon.

Accordingly, in addition to the same effects as those in the first embodiment, the following effects can be obtained in the third embodiment. That is, even when the fuel injection period estimated in the NE pulse interruption process is short due to the short-term injection, the injection end setting interruption process is performed in response to a request which is generated before the opening start time Tpon set in the NE pulse interruption process. Accordingly, the CPU 42 can reliably set the closing start time Tpoff, determined in the CPU 42, in the timer 49 at a setting time earlier than the closing start time Tpoff.

Moreover, even when the injection end setting interruption process of the present injection, started before the opening start time Tpon of the present injection, is performed before the A/D conversion time set in the NE pulse interruption process of the present injection, the CPU 42 determines an estimated value Pest of the injection start time fuel pressure of fuel from the preceding A/D converted value obtained for the preceding injection and determines a fuel injection period of the present injection and a closing start time Tpoff of the present injection from the estimated value Pest of the injection start time fuel pressure. Accordingly, the microcomputer 11 can enhance the precision in the quantity of the injected fuel.

For example, when the injection end setting interruption process (B2) of the present injection is performed before the A/D conversion time set in the NE pulse interruption process (A2) of the present injection, there is a high probability that the performance time of the NE pulse interruption process (A2) and the performance time of the injection end setting interruption process (B2) overlap with the fuel injection period of time in the preceding injection. In this case, the fuel pressure detected to determine the closing start time Tpoff in the injection end setting interruption process (B2) is undesirably reduced. However, because the closing start time Tpoff of the present injection is not determined from the A/D converted value corresponding to the reduced fuel pressure but determined from the estimated value Pest of the injection start time fuel pressure, the precision in the quantity of the injected fuel can be heightened.

Seventh Modification, Relating to Third Embodiment

In the third embodiment, when an injection end setting interruption request is generated at a time earlier than the opening start time Tpon in the case of the short-term injection, the CPU 42 judges whether or not the injection end setting interruption process of the present injection is performed before the A/D converted time of the present injection (steps S410 to S430).

In this modification, in place of the processes at steps S410 to S430, a flag is set at the on-state in the injection end setting interruption process when the injection end setting interruption process of the present injection is performed before the A/D converted time of the present injection. When the flag is set at the on-state, the processes at steps S480 to S520 are performed. In contrast, when the flag is set at the off-state, the processes at steps S440 to S470 are performed.

Accordingly, the ECU 11 can easily judge whether or not the injection end setting interruption process of the present injection is started before the A/D converted time of the present injection.

Eighth Modification, Relating to Third Embodiment

In the third embodiment, when the injection end setting interruption process of the present injection is performed before the A/D converted time of the present injection, the CPU 42 calculates the estimated value Pest of the injection start time fuel pressure from the A/D converted value for the preceding injection, and the CPU 42 determines a closing start time Tpoff from the estimated value. Therefore, the CPU 42 can prevent the closing start time Tpoff from being determined from an A/D converted value which indicates the fuel pressure dropped due to the preceding injection.

However, the difference between the fuel pressure just before the opening start time Tpon of the present injection and the fuel pressure just before the opening start time Tpon of the preceding injection is smaller than the difference between the fuel pressure just before the opening start time Tpon of the present injection and the fuel pressure in the period of the preceding injection. Therefore, in this modification, at step S510, the CPU 42 determines a closing start time Tpoff of the present injection from the A/D converted value of the preceding injection. In this case, the process at step S490 is deleted.

Accordingly, although the precision in the quantity of the injected fuel is reduced, the closing start time Tpoff can be easily calculated. Further, because the closing start time Tpoff is not determined from the fuel pressure in the period of the preceding injection, the precision in the quantity of the injected fuel is not so reduced.

Ninth Modification, Relating to Third Embodiment

In the eighth modification, the A/D converted value for the preceding injection is stored in the specific field of the RAM 44 until the A/D converted value for the present injection is calculated and stored in the RAM 44. Therefore, when the A/D conversion time for the present injection has already passed, the A/D converted value of the present injection is necessarily read out at step S440. In contrast, when the A/D conversion time for the present injection has not yet passed, the A/D converted value of the preceding injection is necessarily read out at step S480.

In the ninth modification, in place of the procedure shown in FIG. 11, the procedure shown in FIG. 4 is performed when the injection end setting interruption request is generated at a time earlier than the opening start time Tpon in the case of the short-term injection. In this case, when the A/D conversion time has already passed, at step S210, the CPU 42 reads out the A/D converted value of the present injection from the RAM 44. Then, the CPU 42 determines a closing start time Tpoff from the A/D converted value of the present injection. In contrast, when the A/D conversion time has not yet passed, at step S210, the CPU 42 reads out the A/D converted value of the preceding injection from the RAM 44. Then, the CPU 42 determines a closing start time Tpoff from the A/D converted value of the preceding injection.

Accordingly, the determination of the closing start time Tpoff can be simplified as compared with the determination according to the eighth modification.

These embodiments and modifications should not be construed as limiting the present invention to structures of those embodiments, and the structure of this invention may be combined with that based on the prior art.

For example, in the first embodiment, the A/D converted value obtained in the A/D converter 41 at the A/D conversion time is transferred to the RAM 44, and the CPU 42 reads out the A/D converted value from the RAM 44 to determine the closing start time Tpoff. However, the CPU 42 may read out the A/D converted value, obtained at the A/D conversion time, from a register of the A/D converter 41. In this case, it is not required to transfer the A/D converted value to the RAM 44.

Further, in the first and third embodiments, each time a new A/D converted value is calculated, the A/D converted value already stored in the RAM 44 is renewed with the new A/D converted value to update the A/D converted value stored in the RAM 44. However, a predetermined number of A/D converted values recently calculated may be stored in regions of the A/D converted value storing area of the RAM 44 such that the CPU 42 can recognize the order of A/D conversion times of the stored A/D converted values. In this case, each time a new A/D converted value is calculated, the A/D converted value calculated at the earliest A/D conversion time is renewed with the new A/D converted value. For example, each new A/D converted value is stored with its A/D conversion time.

Moreover, each injector Ix is formed of an electromagnetic valve. However, each injector Ix may be opened and closed by a piezo-actuator.

Further, in these embodiments, each sensor PS detects the fuel pressure at the inlet of one injector. Therefore, the sensor PS can detect the fuel pressure changed every fuel injection with high precision, so that the microcomputer 11 can control a quantity of the injected fuel with high precision. However, although the fuel pressure in the common rail 15 is not changed so much in response to the fuel injection, the sensor PS may detect the pressure of fuel held in the common rail 15.

Furthermore, in these embodiments, the interruption processes are performed as the first and second process routines. However, task operations may be performed as the first and second process routines.

What is claimed is:

1. A fuel injection control device, comprising:
a central processing unit (CPU);
a driving unit configured to start to open a fuel injection valve of an engine at a valve opening start time set by the CPU and start to close the fuel injection valve at a valve closing start time set by the CPU;
an analog-to-digital (A/D) converter configured to receive a fuel pressure signal to be an analog signal from a fuel pressure sensor for detecting a pressure of a fuel pumped by a fuel pump to the fuel injection valve and perform A/D conversion of the fuel pressure signal to produce an A/D conversion value; and
a fuel pressure acquisition storage circuit that is a circuit operating independently from the CPU and is configured to detect a coming of an A/D conversion time to be a start time of A/D conversion set by the CPU and activate the A/D converter to perform A/D conversion of the fuel pressure signal to produce the A/D conversion value, and which is configured to store the A/D conversion value of the AID converter, wherein:
the CPU is configured to perform a first process routine started in synchronization with rotation of a crankshaft of the engine and perform a second process routine started after completion of the first process routine;
in the first process routine, the CPU sets the valve opening start time in the driving unit and sets the A/D conversion time in the fuel pressure acquisition storage circuit;
in the second process routine, the CPU calculates the valve closing start time required for the fuel injection valve opening on coming of the valve opening start time to inject the fuel of a required injection quantity, based on the valve opening start time set in the driving unit in the first process routine, a required injection quantity associated with a state of the engine, and the A/D conversion value stored by the fuel pressure acquisition storage circuit, and sets the calculated valve closing start time in the driving unit; and
the fuel pressure sensor is located in a fuel supply line extending from a common rail holding the fuel pumped by the fuel pump to the fuel injection valve and detects the pressure of the fuel supplied from the fuel supply line to the fuel injection valve.

2. The fuel injection control device according to claim 1, wherein:
the fuel pressure acquisition storage circuit is configured to activate the A/D converter to perform A/D conversion of the fuel pressure signal a predetermined number of times equal to two or more, for every predetermined amount of time after the start time of A/D conversion that is set as the A/D conversion time by the CPU, to produce a plurality of A/D conversion values, and stores the plurality of A/D conversion values.

3. The fuel injection control device according to claim 2, wherein:
in the second process routine, the CPU calculates an average value of at least a part of the plurality of A/D conversion values stored by the fuel pressure acquisition storage circuit, and calculates the valve closing start time using the average value.

4. The fuel injection control device according to claim 3, wherein:
in the second process routine, the CPU selects, from the plurality of A/D conversion values stored by the fuel pressure acquisition storage circuit, n×N A/D conversion values produced at time intervals equal to 1/n of a period of ripple that occurs in the fuel pressure signal due to a fuel injection of the fuel injection valve or a fuel pumping of the fuel pump, and calculates the valve closing start time using an average value of the selected A/D conversion values, where n represents even numbers equal to two or more and N represents an integral number equal to one or more.

5. The fuel injection control device according to claim 3, wherein:
the predetermined amount of time is an amount of time equal to 1/n of a period of ripple that occurs in the fuel pressure signal due to a fuel injection of the fuel injection valve or a fuel pumping of the fuel pump, where n represents even numbers equal to two or more, and
in the second process routine, the CPU calculates the valve closing start time using an average value of n×N A/D conversion values stored in by fuel pressure acquisition storage circuit, where n represents even numbers equal to two or more and N represents an integral number equal to one or more.

6. The fuel injection control device according to claim 2, wherein:
the fuel pressure acquisition storage circuit is further configured to store time information capable of identifying A/D conversion execution time of the respective A/D conversion values associated with the respective A/D conversion values.

7. The fuel injection control device according to claim 1, wherein:
in the first process, the CPU sets, as the A/D conversion time, a time between actual completion time of the previous injection and actual completion time of the present injection.

8. The fuel injection control device according to claim 7, wherein:
when the second process routine is performed before the A/D conversion time set in the first process routine, in the second process routine, the CPU estimates a pressure value of the fuel pumped to the fuel injection valve on start of the present fuel injection based on the A/D conversion values of the fuel pressure signal produced by the fuel pressure acquisition storage circuit for calculating the valve closing start time of the previous fuel injection, and calculates the valve closing start time of the present fuel injection using the estimated pressure value.

9. The fuel injection control device according to claim 1, wherein:
when the second process routine is performed before the A/D conversion time set in the first process routine, in the second process routine, the CPU calculates the valve closing start time of the present fuel injection using the A/D conversion values of the fuel pressure signal produced by the fuel pressure acquisition storage circuit for calculating the valve closing start time of the previous fuel injection.

10. The fuel injection control device according to claim 9, wherein:
in the second process routine, the CPU judges whether or not the A/D conversion time that is set in the first process routine performed before the second process routine has passed, and, if the A/D conversion time has not passed, the CPU estimates a pressure value of a fuel pumped to the fuel injection valve on start of the present fuel injection based on the A/D conversion values of the fuel pressure signal produced by the fuel pressure acquisition storage circuit for calculating the valve closing start time of the previous fuel injection, and calculates the valve closing start time of the present fuel injection using the estimated pressure value.

11. The fuel injection control device according to claim 1, further comprising:
a random access memory (RAM) in which the A/D conversion value of the fuel pressure signal is stored by the fuel pressure acquisition storage circuit.

12. The fuel injection control device according to claim 11, wherein:
the fuel pressure acquisition storage circuit includes:
an A/D converter control circuit that controls the A/D converter; and
a direct memory access controller that controls the RAM to store the A/D conversion value of the fuel pressure signal.

13. A method of controlling fuel injection, the method comprising:
starting to open a fuel injection valve of an engine at a valve opening start time set by a computer processing system and starts to close the fuel injection valve on coming of a valve closing start time set by the computer processing system;
receiving, in an analog-to-digital (A/D) converter, an analog fuel pressure signal from a fuel pressure sensor for detecting a pressure of a fuel pumped by a fuel pump to the fuel injection valve and performing A/D conversion of the fuel pressure signal to produce an A/D conversion value; and
detecting occurrence, by a fuel pressure acquisition storage circuit which operates independent from the computer processing system, of an A/D conversion time to be a start time of A/D conversion set by the computer processing system and activating the A/D converter to perform A/D conversion of the fuel pressure signal to produce the A/D conversion value, and storing the A/D conversion value of the A/D converter;
performing, using the computer processing system, a first process routine started in synchronization with rotation of a crankshaft of the engine and performing a second process routine started after completion of the first process routine; wherein
in the first process routine, the computer processing system sets the valve opening start time in the driving unit and sets the A/D conversion time in the fuel pressure acquisition storage circuit;
in the second process routine, the computer processing system calculates the valve closing start time required for the fuel injection valve opening on coming of the valve opening start time to inject the fuel of a required injection quantity, based on the valve opening start time set in the driving unit in the first process routine, a required injection quantity associated with a state of the engine, and the A/D conversion value stored by the fuel pressure acquisition storage circuit, and sets the calculated valve closing start time in the driving unit; and
the fuel pressure sensor is located in a fuel supply line extending from a common rail holding the fuel pumped by the fuel pump to the fuel injection valve and detects the pressure of the fuel supplied from the fuel supply line to the fuel injection valve.

14. The method according to claim 13, wherein:
the fuel pressure acquisition storage circuit activates the A/D converter to perform A/D conversion of the fuel pressure signal a predetermined number of times equal to two or more, for every predetermined amount of time after the start time of A/D conversion that is set as the A/D conversion time by the computer processing system, to produce a plurality of A/D conversion values, and stores the plurality of A/D conversion values.

15. The method according to claim 13, wherein:
in the first process, the computer processing system sets, as the A/D conversion time, a time between actual completion time of the previous injection and actual completion time of the present injection.

16. The method according to claim 13, wherein:
when the second process routine is performed before the A/D conversion time set in the first process routine, in the second process routine, the computer processing system calculates the valve closing start time of the present fuel injection using the A/D conversion values of the fuel pressure signal produced by the fuel pressure acquisition storage circuit for calculating the valve closing start time of the previous fuel injection.

17. The method according to claim 13, further comprising:
storing the A/D conversion value of the fuel pressure signal in a random access memory (RAM).

* * * * *